US012570045B2

(12) United States Patent
Leavitt et al.

(10) Patent No.: US 12,570,045 B2
(45) Date of Patent: Mar. 10, 2026

(54) 3D PRINTER WITH A PLURALITY OF PARTITIONED CHAMBERS

(71) Applicant: Stratasys, Inc., Eden Prairie, MN (US)

(72) Inventors: Paul Joseph Leavitt, Minneapolis, MN (US); Thomas Joseph McDonough, Inver Grove Heights, MN (US)

(73) Assignee: STRATASYS, INC., Minnetonka, MN (US)

( * ) Notice: Subject to any disclaimer, the term of this patent is extended or adjusted under 35 U.S.C. 154(b) by 95 days.

(21) Appl. No.: 18/148,621

(22) Filed: Dec. 30, 2022

(65) Prior Publication Data

US 2023/0211556 A1      Jul. 6, 2023

Related U.S. Application Data

(60) Provisional application No. 63/295,149, filed on Dec. 30, 2021.

(51) Int. Cl.
*B29C 64/25*      (2017.01)
*B29C 64/209*      (2017.01)
(Continued)

(52) U.S. Cl.
CPC ............ *B29C 64/25* (2017.08); *B29C 64/209* (2017.08); *B29C 64/236* (2017.08); *B29C 64/245* (2017.08); *B33Y 30/00* (2014.12)

(58) Field of Classification Search
CPC ..... B29C 64/25; B29C 64/209; B29C 64/236; B29C 64/245; B29C 64/295;
(Continued)

(56) References Cited

U.S. PATENT DOCUMENTS

| | | | |
|---|---|---|---|
| 4,876,506 A | 10/1989 | Brown et al. | |
| 5,049,898 A | 9/1991 | Arthur | |

(Continued)

FOREIGN PATENT DOCUMENTS

| | | | |
|---|---|---|---|
| CA | 3 013 502 A1 | 8/2017 | |
| CA | 3 042 670 A1 | 11/2019 | |

(Continued)

OTHER PUBLICATIONS

KR 20090014395 (Year: 2009).*

(Continued)

*Primary Examiner* — Xiao S Zhao
*Assistant Examiner* — Guy F Mongelli
(74) *Attorney, Agent, or Firm* — Westman, Champlin & Koehler, P.A.

(57) ABSTRACT

A 3D printer includes a gantry configured to move in a plane and in a direction substantially normal to the plane and at least one print head carried by the gantry, the at least on print head comprising an extrusion nozzle at a bottom end. The 3D printer includes a plurality of partitioned chambers accessible by the at least one print head, each of the partitioned chambers having an upper edge defining an opening into each of the plurality of chambers, and a platen within a first chamber of the plurality of chambers, the platen configured to receive material from the print head to print the 3D part. The at least one print head is configured to be moved between each of the plurality of partitioned chambers by raising the print head in the direction substantially normal to the plane such that the extrusion nozzle is above the upper edge of the plurality of chambers, moving the print head in the plane from a first location above the first chamber of the plurality of partitioned chambers to a second location above a second chamber of the plurality of parti- (Continued)

tioned chambers and lowering the at least one print head into the second chamber.

19 Claims, 23 Drawing Sheets

(51) Int. Cl.
B29C 64/236 (2017.01)
B29C 64/245 (2017.01)
B33Y 30/00 (2015.01)
(58) Field of Classification Search
CPC ..... B29C 64/118; B29C 64/393; B33Y 30/00; B33Y 10/00; B33Y 50/02
See application file for complete search history.

(56) References Cited

U.S. PATENT DOCUMENTS

| | | | |
|---|---|---|---|
| 5,121,329 A | 6/1992 | Crump | |
| 5,339,031 A | 8/1994 | Chern | |
| 5,866,058 A | 2/1999 | Batchelder et al. | |
| 6,547,995 B1 | 4/2003 | Comb | |
| 6,722,872 B1 | 4/2004 | Swanson et al. | |
| 7,127,309 B2 | 10/2006 | Dunn et al. | |
| 7,297,304 B2 | 11/2007 | Swanson et al. | |
| 7,625,198 B2 | 12/2009 | Lipson et al. | |
| 7,939,003 B2 | 5/2011 | Bonassar et al. | |
| 8,033,811 B2 | 10/2011 | Swanson et al. | |
| 8,926,484 B1 | 1/2015 | Comb et al. | |
| 8,955,558 B2 | 2/2015 | Bosveld et al. | |
| 8,961,167 B2 * | 2/2015 | Swanson | B29C 64/112 |
| | | | 425/375 |
| 9,108,360 B2 | 8/2015 | Comb et al. | |
| 9,238,329 B2 | 1/2016 | Swanson et al. | |
| 9,427,838 B2 | 8/2016 | Comb et al. | |
| 9,469,072 B2 | 10/2016 | Schmehl et al. | |
| 9,481,132 B2 | 11/2016 | Schmehl et al. | |
| 10,214,004 B2 | 2/2019 | Schmehl et al. | |
| 10,217,005 B2 | 2/2019 | Liu et al. | |
| 10,562,289 B2 | 2/2020 | Skubic et al. | |
| 11,584,088 B2 | 2/2023 | Yamazaki | |
| 11,760,015 B2 | 9/2023 | Leavitt et al. | |
| 11,919,242 B2 | 3/2024 | Bosveld et al. | |
| 11,994,412 B2 | 5/2024 | Bosveld et al. | |
| 2002/0062909 A1 * | 5/2002 | Jang | B33Y 10/00 |
| | | | 156/307.3 |
| 2005/0116391 A1 * | 6/2005 | Lindemann | B22F 10/28 |
| | | | 264/497 |
| 2006/0156978 A1 | 7/2006 | Lipson et al. | |
| 2006/0160250 A1 | 7/2006 | Bonassar et al. | |
| 2010/0021580 A1 * | 1/2010 | Swanson | B33Y 30/00 |
| | | | 425/132 |
| 2012/0161350 A1 * | 6/2012 | Swanson | B29C 64/106 |
| | | | 264/40.7 |
| 2012/0164256 A1 | 6/2012 | Swanson et al. | |
| 2013/0078073 A1 * | 3/2013 | Comb | B33Y 40/00 |
| | | | 414/800 |
| 2013/0333798 A1 * | 12/2013 | Bosveld | B29C 64/329 |
| | | | 141/2 |
| 2015/0137401 A1 | 5/2015 | Comb et al. | |
| 2015/0190966 A1 * | 7/2015 | Griszbacher | B33Y 30/00 |
| | | | 425/72.1 |
| 2015/0273582 A1 * | 10/2015 | Crump | B22F 12/50 |
| | | | 419/38 |
| 2015/0375453 A1 * | 12/2015 | Yost | B29C 64/393 |
| | | | 435/174 |
| 2016/0068793 A1 * | 3/2016 | Maggiore | C12M 41/12 |
| | | | 901/22 |
| 2016/0136893 A1 | 5/2016 | Chang et al. | |
| 2016/0136894 A1 | 5/2016 | Din et al. | |
| 2017/0050383 A1 | 2/2017 | Bell et al. | |
| 2017/0057173 A1 | 3/2017 | van der Zalm | |
| 2017/0064840 A1 * | 3/2017 | Espalin | B33Y 80/00 |
| 2017/0120522 A1 | 5/2017 | Skubic et al. | |
| 2017/0225227 A1 * | 8/2017 | Volk | B22F 10/47 |
| 2017/0297320 A1 * | 10/2017 | Swanson | B29C 64/245 |
| 2018/0015655 A1 | 1/2018 | Gheorghescu et al. | |
| 2018/0194056 A1 | 7/2018 | van der Zalm | |
| 2019/0210284 A1 * | 7/2019 | Bosveld | B29C 64/25 |
| 2019/0322048 A1 | 10/2019 | Huitema et al. | |
| 2020/0171811 A1 | 6/2020 | Bell et al. | |
| 2020/0269506 A1 | 8/2020 | Macmullen et al. | |
| 2020/0282659 A1 | 9/2020 | Lan et al. | |
| 2020/0406547 A1 | 12/2020 | Yuwaki | |
| 2021/0046709 A1 | 2/2021 | Barbolini | |
| 2021/0107160 A1 | 4/2021 | Kokubo | |
| 2021/0197285 A1 | 7/2021 | Schodin et al. | |
| 2022/0057771 A1 * | 2/2022 | Beffrey | G05B 19/19 |
| 2022/0396033 A1 | 12/2022 | Liu | |
| 2022/0410273 A1 | 12/2022 | Price | |
| 2023/0028236 A1 * | 1/2023 | Leavitt | B29C 64/245 |
| 2023/0064999 A1 | 3/2023 | Yamazaki | |
| 2023/0202112 A1 | 6/2023 | Bosveld et al. | |
| 2023/0211553 A1 | 7/2023 | Leavitt et al. | |
| 2023/0211556 A1 | 7/2023 | Leavitt et al. | |
| 2023/0243671 A1 | 8/2023 | Melvin et al. | |
| 2023/0243672 A1 | 8/2023 | Bosveld et al. | |

FOREIGN PATENT DOCUMENTS

| | | | | |
|---|---|---|---|---|
| CN | 112 497 746 A | 3/2021 | | |
| EP | 2 655 046 A1 | 10/2013 | | |
| EP | 3 495 144 A1 | 6/2019 | | |
| EP | 3865879 A1 | 8/2021 | | |
| FR | 3 076 484 A1 | 7/2019 | | |
| JP | 2017159620 A | 9/2017 | | |
| KR | 20090014395 A * | 2/2009 | | B33Y 30/00 |
| WO | 2012/070052 | 5/2012 | | |
| WO | 2012/085914 | 6/2012 | | |
| WO | 2014/137637 | 9/2014 | | |
| WO | 2016088049 A1 | 6/2016 | | |
| WO | 2018038749 A1 | 3/2018 | | |
| WO | 2018/069720 | 4/2018 | | |
| WO | 2017044892 A1 | 7/2018 | | |
| WO | 2018069749 A1 | 7/2018 | | |
| WO | 2018069750 A1 | 7/2018 | | |
| WO | 2020030964 A1 | 2/2020 | | |
| WO | 2020237166 A2 | 11/2020 | | |
| WO | 2022/232248 | 11/2022 | | |
| WO | WO-2022232248 A1 * | 11/2022 | | B33Y 30/00 |
| WO | 2023/003590 | 1/2023 | | |
| WO | 2023/129333 | 7/2023 | | |

OTHER PUBLICATIONS

International Search Report and Written Opinion mailed Mar. 27, 2023 for PCT/US2022/051617 filed Dec. 2, 2022.

Anonymous: "The first printer to automatically correct its geometry in all axes (Update: New Video)—Prusa Printers", Sep. 21, 2016 (Sep. 21, 2016), XP055731490, Retrieved from the Internet: https://blog.prusaprinters.org/first-printer-to-automatically-correct-geometry-in-all-axes_4451/[retrieved on Jun. 17, 2020] pp. 1-6.

Schouten Martijn et al.: "Inductive XY calibration method for multi-material fused filament fabrication 3D printers" Additive Manufacturing, [Online] vol. 56, May 23, 2022 (May 23, 2022), p. 102890, XP093031692, NL ISSN: 2214-8064, DOI: 10.1016/j.addma.2022.102890 Retrieved from the Internet: https://ris.utwente.nl/ws/portalfiles/portal/282087575/1_s2 .0_S2214860422002883_main.pdf [retrieved on Mar. 14, 2023] pp. 1-2.

Communication pursuant to Rules 161(1) and 162 EPC from European Application No. 21848479.8, dated Mar. 1, 2024.

Davies, Sam "Titan Robotics launch The Cronus 3D printer with five print heads" 2017 Ces 3D Printing Marketplace sponsored by TCT, Jan. 9, 2017, https://www.tctmagazine.com/3d-printing-at-ces/titan-robotics-launch-the-cronus-3d-printer-five-print-heads/.

Parker, Michael "Close Up of Titan Robotics' Cronus at RAPID +tct 2017" Youtube, uploaded by Michael Parker, May 11, 2017, https://www.youtube.com/watch?v=XOgC30zDTYc.

(56) References Cited

OTHER PUBLICATIONS

International Search Report and Written Opinion mailed May 4, 2022 for PCT/US2021/065693 filed Dec. 30, 2021.

First Office Action from Chinese Application Serial No. 202190001057.7 issued Jul. 24, 2024.

Office Action from Japanese Application Serial No. 2024-600016, issued Jun. 11, 2024.

Communication pursuant to Rules 161(1) and 162 EPC from European Patent Application No. 22846976.3, dated Aug. 6, 2024.

Prosecution history from corresponding U.S. Appl. No. 17/566,081, filed Dec. 30, 2021, including: Notice of Allowance and Fee(s) Due mailed Jul. 6, 2023, Corrected Notice of Allowability mailed Jul. 24, 2023; and Supplemental Notice of Allowability mailed Aug. 9, 2023.

U.S. Patent Office issued prosectution for U.S. Appl. No. 17/562,377, filed Dec. 27, 2021, including: Notice of Allowance and Fees Due (PTOL-85) and Examiner Initiated Interview Summary issued Nov. 16, 2023, 11 pages; Restriction Requirement issued Jul. 27, 2023, 6 pages; 17 pages total.

International Search Report and Written Opinion mailed Jun. 25, 2014 for PCT/US2014/017915 filed Feb. 24, 2014.

Office Action from U.S. Appl. No. 18/148,614, dated Oct. 17, 2024.

Office Action from U.S. Appl. No. 18/355,905, dated Oct. 22, 2024.

U.S. Patent Office issued prosecution for U.S. Appl. No. 18/422,424, filed Jan. 25, 2024, including: Notice of Allowance and Fees Due (PTOL-85) issued Sep. 3, 2024.

\* cited by examiner

514

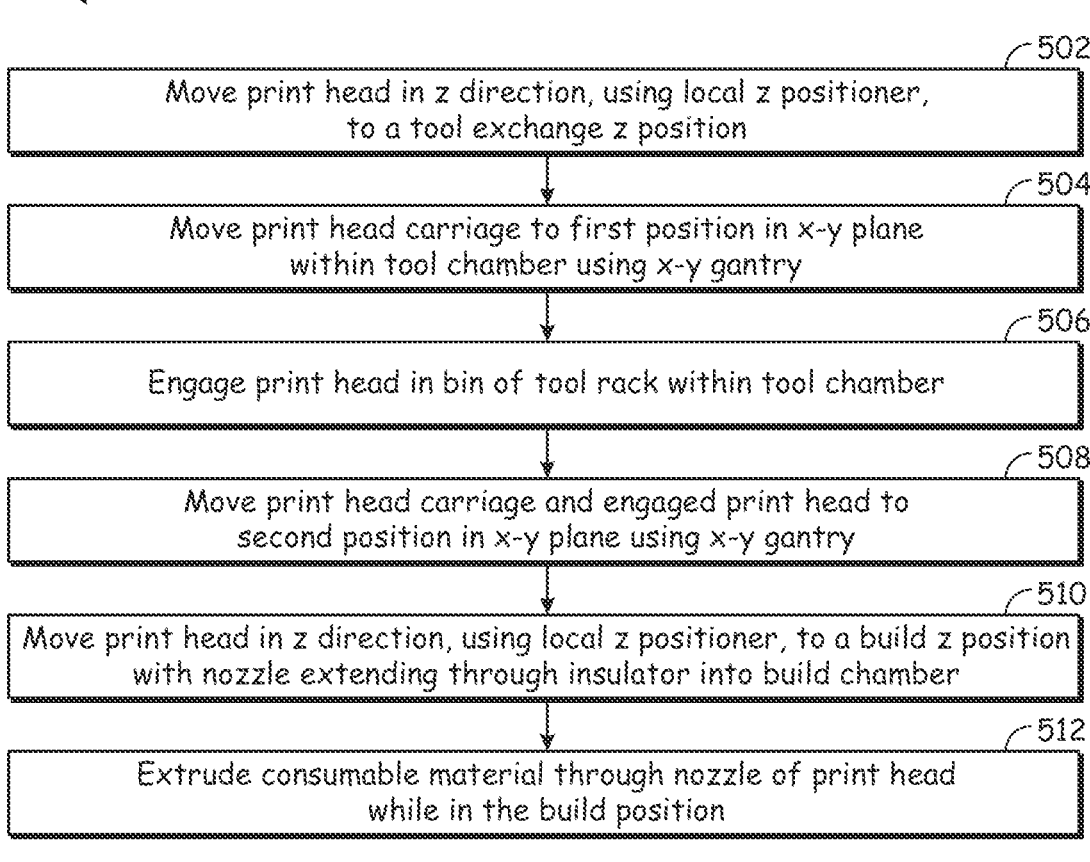

502

Move print head in z direction, using local z positioner,
to a tool exchange z position

504

Move print head carriage to first position in x-y plane
within tool chamber using x-y gantry

506

Engage print head in bin of tool rack within tool chamber

508

Move print head carriage and engaged print head to
second position in x-y plane using x-y gantry

510

Move print head in z direction, using local z positioner, to a build z position
with nozzle extending through insulator into build chamber

512

Extrude consumable material through nozzle of print head
while in the build position

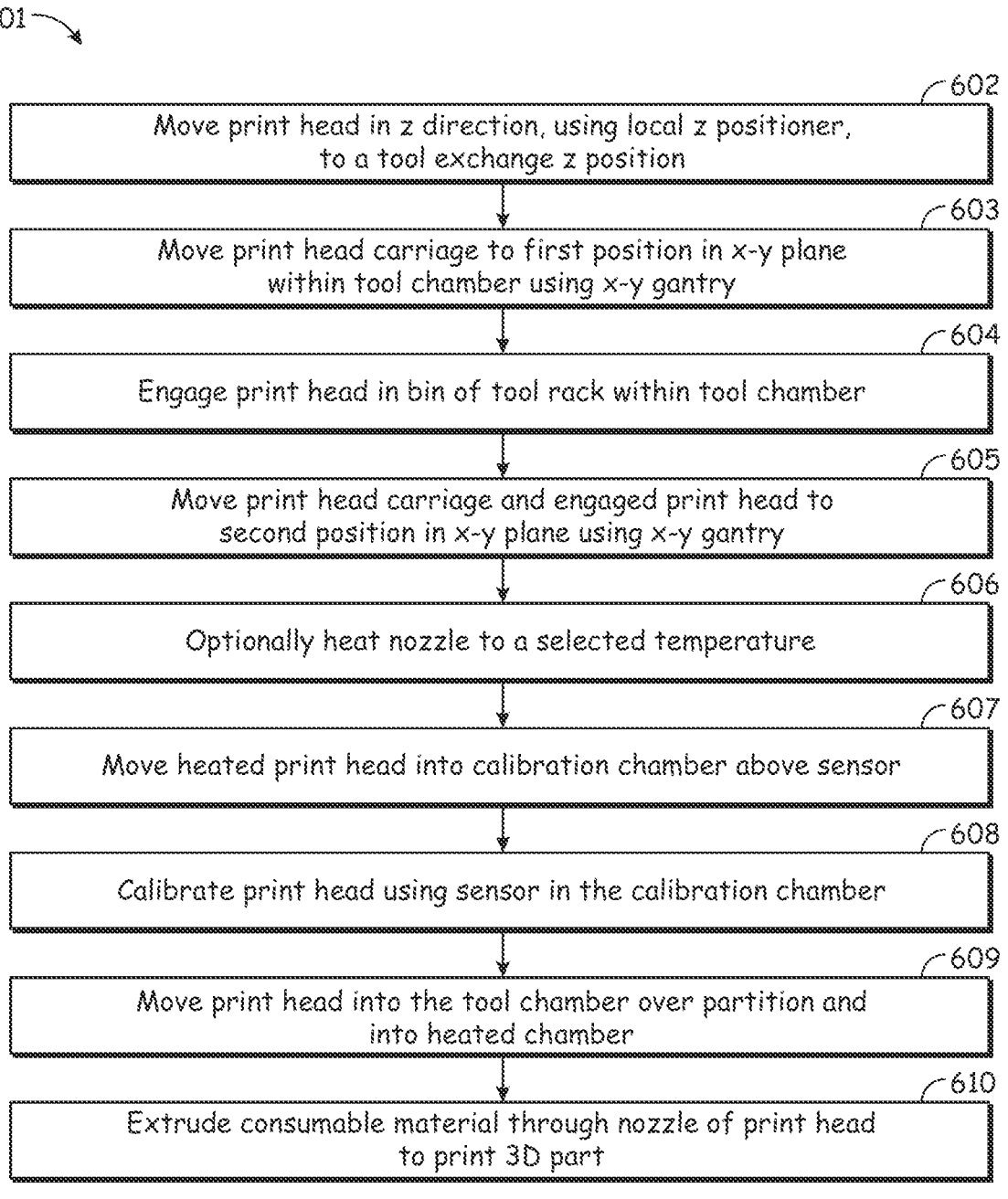

602
Move print head in z direction, using local z positioner,
to a tool exchange z position 603
Move print head carriage to first position in x-y plane
within tool chamber using x-y gantry 604
Engage print head in bin of tool rack within tool chamber 605
Move print head carriage and engaged print head to
second position in x-y plane using x-y gantry 606
Optionally heat nozzle to a selected temperature 607
Move heated print head into calibration chamber above sensor 608
Calibrate print head using sensor in the calibration chamber 609
Move print head into the tool chamber over partition and
into heated chamber 610
Extrude consumable material through nozzle of print head
to print 3D part

FIG. 16

3D PRINTER WITH A PLURALITY OF PARTITIONED CHAMBERS

CROSS-REFERENCE TO RELATED APPLICATION

The present application is based on and claims the benefit of U.S. provisional patent application Ser. No. 63/295,149, filed Dec. 30, 2021, the content of which is hereby incorporated by reference in its entirety.

BACKGROUND

The present disclosure relates to additive manufacturing systems for 3D printing of parts. In particular, the present disclosure relates to 3D printers having a plurality of partitioned chambers that provide different functionalities. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

As 3D printers become more complex and demanding of multiple functionalities, there is a need for a 3D printer with a plurality of partitioned chambers that are accessible by one or more print heads to provide the multiple functionalities.

SUMMARY

An aspect of the present disclosure is directed to a 3D printer. Th 3D printer includes a gantry configured to move in a plane and in a direction substantially normal to the plane and at least one print head carried by the gantry, the at least on print head comprising an extrusion nozzle at a bottom end. The 3D printer includes a plurality of partitioned chambers accessible by the at least one print head, each of the partitioned chambers having an upper edge defining an opening into each of the plurality of chambers, and a platen within a first chamber of the plurality of chambers, the platen configured to receive material from the print head to print the 3D part. The at least one print head is configured to be moved between each of the plurality of partitioned chambers by raising the print head in the direction substantially normal to the plane such that the extrusion nozzle is above the upper edge of the plurality of chambers, moving the print head in the plane from a first location above the first chamber of the plurality of partitioned chambers to a second location above a second chamber of the plurality of partitioned chambers and lowering the at least one print head into the second chamber.

Another aspect of the present disclosure relates to a 3D printer. The 3D printer includes a gantry configured to move in a plane and in a direction substantially normal to the plane, and at least one print head carried by the gantry, the at least on print head comprising an extrusion nozzle at a bottom end. The 3D printer includes a plurality of partitioned chambers accessible by the at least one print head, each of the partitioned chambers having an upper edge defining an opening into each of the plurality of chambers, and a thermal barrier spanning the plurality of partitioned chambers and located above the upper edges of the plurality of partitioned chambers, wherein the at least one print head is configured to access each of the plurality of partitioned chambers through the thermal barrier. The at least one print head is configured to be moved between each of the plurality of partitioned chambers by raising the print head in the direction substantially normal to the plane such that the extrusion nozzle is above the thermal barrier, moving the print head in the plane from a first location above a first chamber of the plurality of partitioned chambers to a second location above a second chamber of the plurality of partitioned chambers and lowering the at least one print head into the second chamber through the thermal partition.

Another aspect of the present disclosure relates to a 3D printer. The 3D printer includes a gantry configured to move in a xy plane and in a z direction substantially normal to the xy plane, and at least one print head carried by the gantry, the at least on print head comprising an extrusion nozzle at a bottom end. The 3D printer includes a plurality of partitioned chambers accessible by the at least one print head, each of the partitioned chambers having an upper edge defining an opening into each of the plurality of chambers, and a thermal barrier spanning the plurality of partitioned chambers and located above the upper edges of the plurality of partitioned chambers. The thermal barrier includes a first strap extending between opposing sides of the thermal barrier and having a first free edge, and a second strap extending between the opposing sides of the thermal barrier and having a second free edge that overlaps with the first free edge to form a slit though which the bottom end of the at least one print head is inserted to each of the plurality of partitioned chambers through the slit. The at least one print head is configured to be moved between each of the plurality of partitioned chambers by raising the print head in the z direction and through the slit such that the extrusion nozzle is above the thermal barrier, moving the print head in the xy plane from a first location above a first chamber of the plurality of partitioned chambers to a second location above a second chamber of the plurality of partitioned chambers and lowering the at least one print head in the z direction into the second chamber through the slit in the thermal partition.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The terms "additive manufacturing system" and "3D printer" refer to a system that prints, builds, or otherwise produces parts, prototypes, or other 3D items and/or support structures at least in part using an additive manufacturing technique. The additive manufacturing system may be a stand-alone 3D printer or a sub-unit of a larger system or production line, it may be in a closed environment (e.g., a box unit) or in an open environment, and/or it may include other non-additive manufacturing features, such as subtractive-manufacturing features, pick-and-place features, two-dimensional printing features, and the like.

The term "local Z positioner" refers to a print head positioner supported by an x-y gantry and configured to move the print head or a print head carriage in a z-band of motion along a vertical z-axis, orthogonal to x and y directions of movement of the x-y gantry.

The term "primary Z positioner" refers to a gantry configured to move a print platen in a vertical z-axis direction, typically between printing layers of a part.

The term "toolpath(s)" refers to computer-instructed trajectories of a tool in an additive manufacturing process, generated according to individual part geometries. In fused deposition modeling and other material extrusion process, a toolpath is the path of travel for a nozzle to deposit beads or roads of material in the build space. Toolpaths may form planar patterns (e.g., toolpaths printed substantially in a planar layer slice, typically parallel to a build substrate) or non-planar patterns (e.g., 3D toolpaths printed in free space or deposited onto a non-surface).

The term "toolpath plan" or "path plan" refers to a set of generated toolpaths for forming a part(s), and may include parameters required to obtain a desired thickness (or "slice height") and width of deposited beads or roads of material along the toolpaths.

BRIEF DESCRIPTION OF THE DRAWINGS

FIG. 12 is a block diagram illustrating a method of building a 3D object.

FIG. 16 is another block diagram illustrating a method of building a 3D object.

DETAILED DESCRIPTION

The present disclosure is directed to 3D printers having a print head carriage driven by an x-y gantry and carrying a local Z positioner, such that one or more print heads are configured to be moved in the x, y and z directions by the print head carriage. In general, a 3D printer used with the present invention includes a build chamber, a build platform that provides a substantially flat build surface within the build chamber on which to build parts, a z-gantry ("primary z positioner") for incrementing the build platform in a z-direction as a part is constructed layer-by-layer, and a tool rack within the operable space of the local Z positioner of the printer for holding print heads and optionally, other build tools for use in constructing the part. Disclosed embodiments include a high performance, linear motor driven print head gantry (x-y gantry) and a linear motor "local Z positioner" providing a local Z range of motion of the print head, carried by the linear motor driven x-y gantry. The local Z positioner is low mass and stiff enough to perform functions such as extruding in non-planar toolpaths, and elevating the print head carriage to reach an overhead head tool rack for loading and exchanging print heads.

The present disclosure is also directed to 3D printers having a heated build chamber and a separate tool chamber positioned above the heated build chamber. The tool chamber includes the tool rack for holding print heads and optionally, other build tools for use in constructing the part. The heated build chamber and the tool chamber are separated by an insulator in a system which allows a nozzle of a print head to extend from the tool chamber into the heated build chamber for extruding material to build the part on the build platform. The primary z positioner incrementally lowers the build platform within the build chamber as the part is constructed layer-by-layer.

Figure 1:
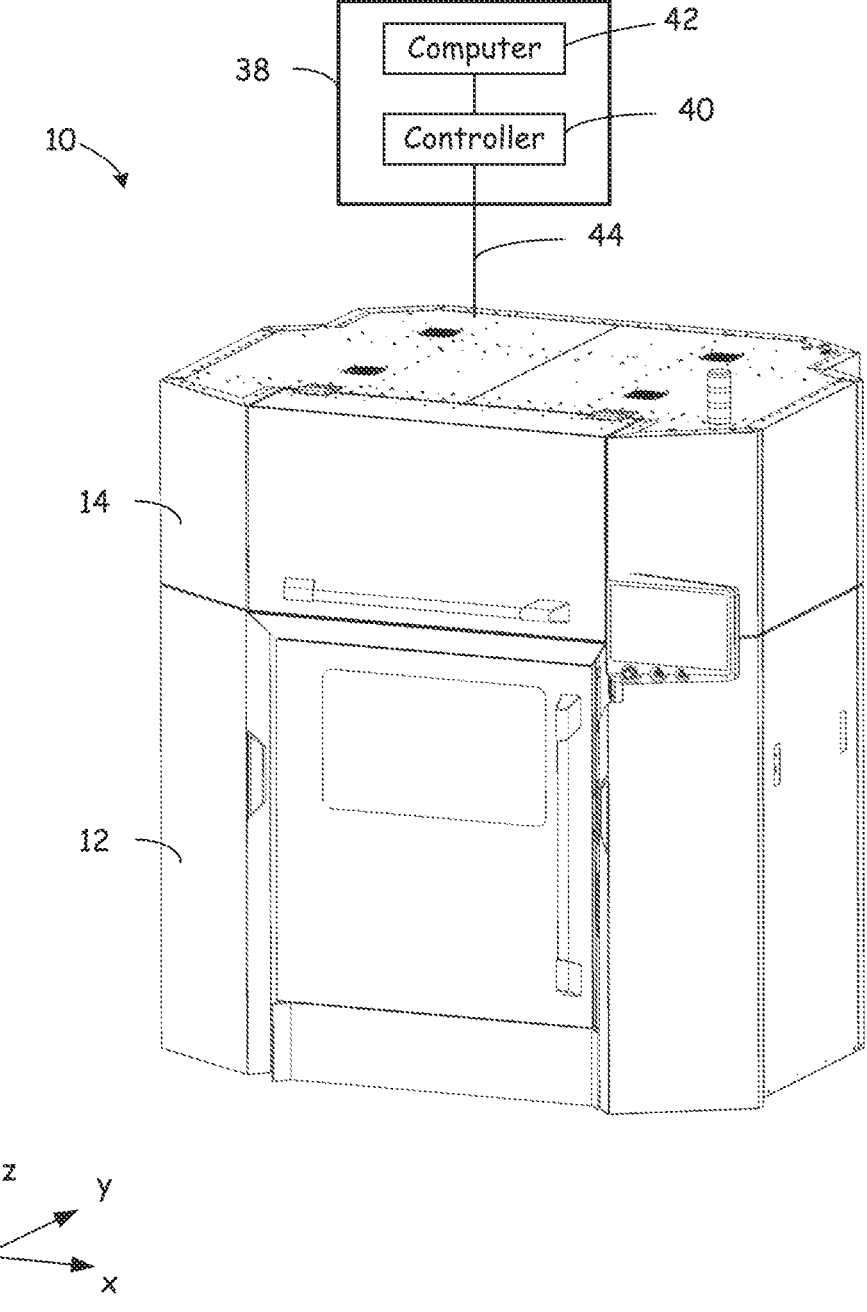
FIG. 1 is a perspective view of an extrusion-based 3D printer of the present invention having a heated build chamber positioned below a tool chamber.
Figure 2:
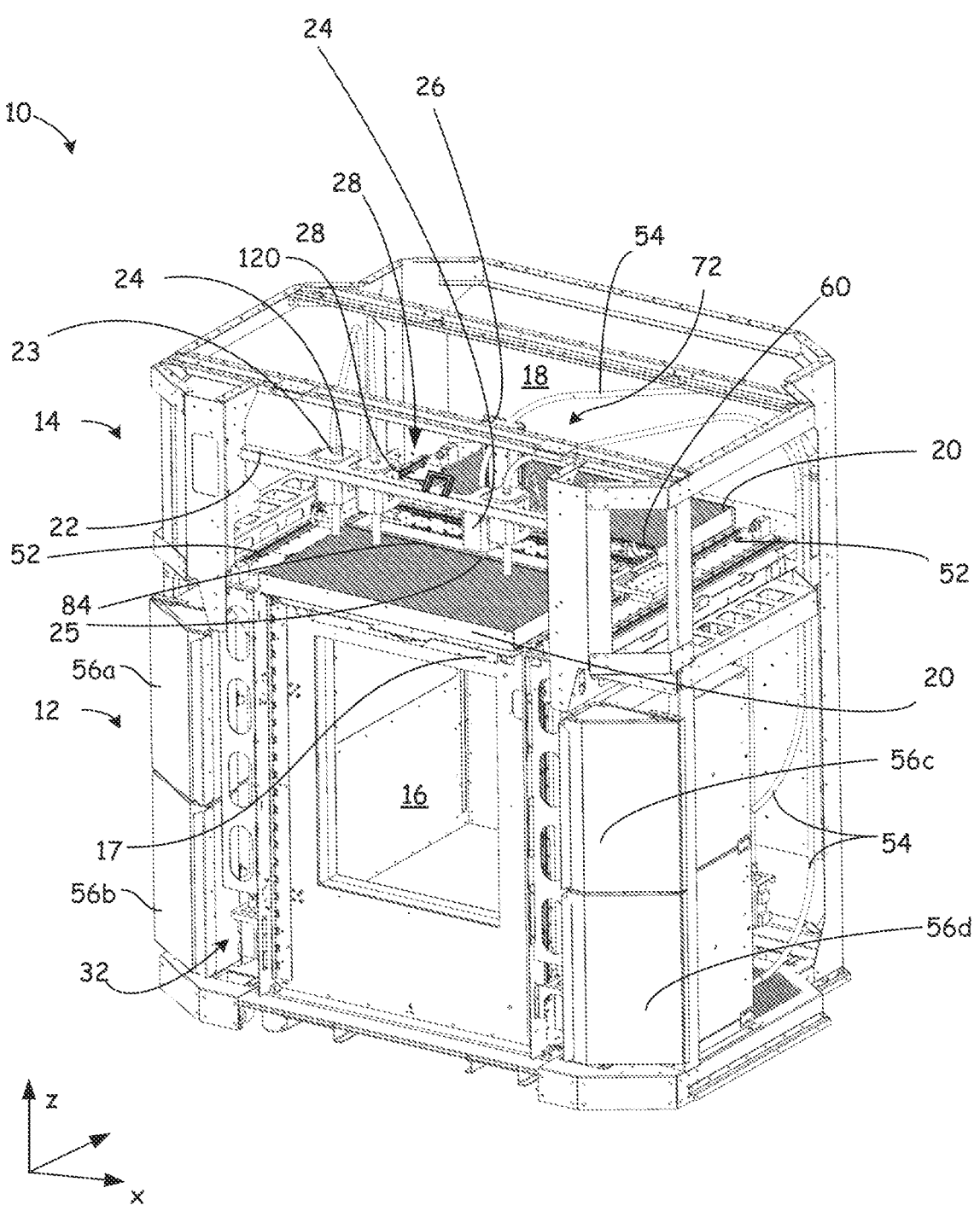
FIG. 2 is a perspective view of portions of the 3D printer shown in FIG. 1, with portions of the frame or cabinet removed to illustrate separation of the build and tool chambers and other features in greater detail.
Figure 3:
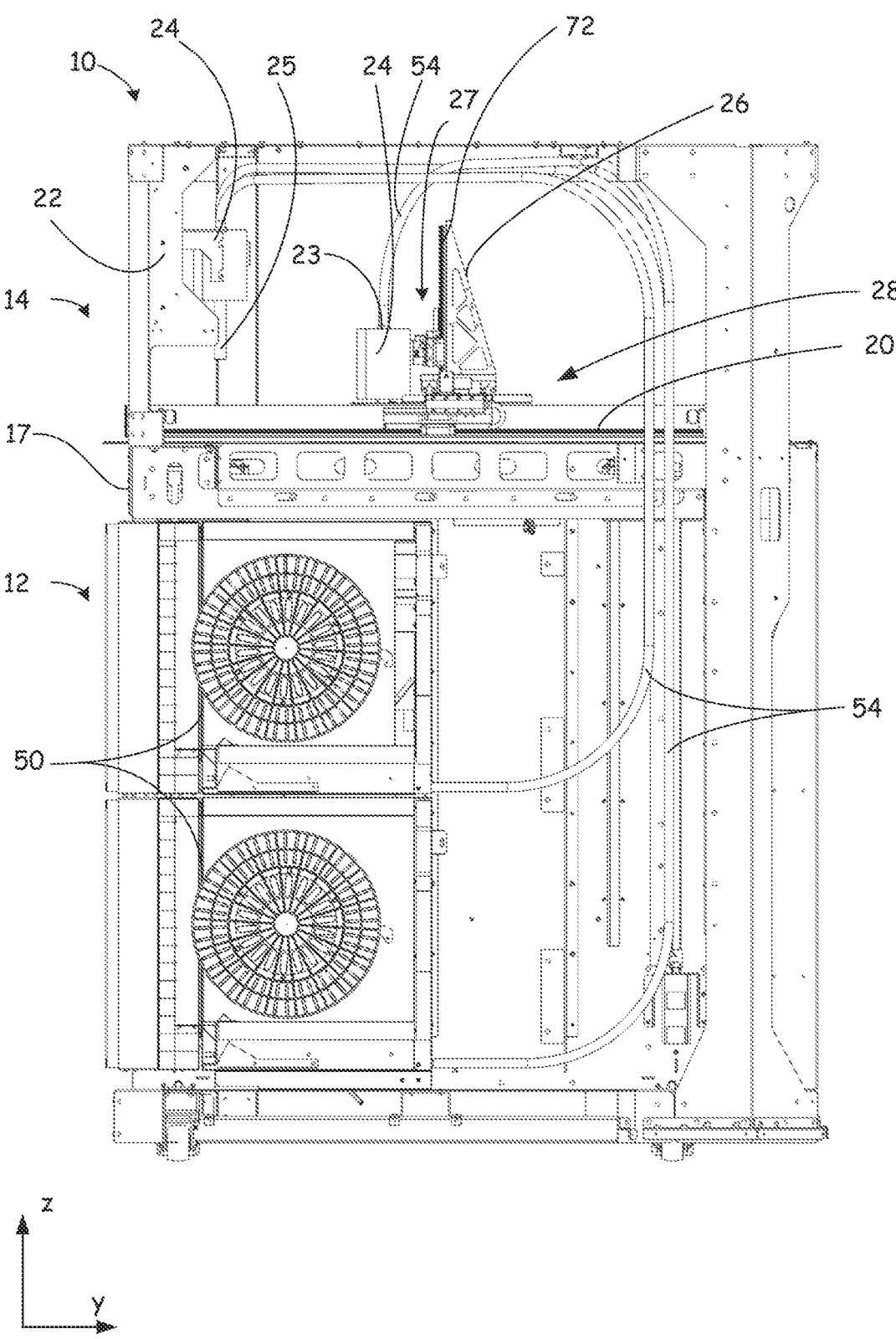
FIGS. 3-5 are views of the 3D printer shown in FIG. 1, illustrating filament spool cabinets, x-y gantry and local Z positioner features, and an insulator separating the build and tool chambers.

The present disclosure may be used with any suitable additive manufacturing system, commonly referred to as a 3D printer. For example, FIGS. 1-5A illustrate a 3D printer 10 having features as discussed above. FIG. 1 is a perspective view of the 3D printer enclosed in cabinets. FIGS. 2-5 are perspective views, side views or top views of the 3D printer with portions removed to illustrate internal features more clearly. As shown initially in FIGS. 1 and 2, 3D printer 10 includes a build chamber cabinet 12 housing a heated build chamber 16 and a tool chamber cabinet 14 housing a separate tool chamber 18, with the tool chamber positioned on top of the build chamber. The tool chamber 18 houses multiple individually powered tools, in a tool rack 22, including selectable print heads 24. The 3D printer 10 includes a calibration chamber 17, where the calibration chamber 17 is thermally separated from the heated chamber 16 but adjacent thereto. The tool chamber is unheated to protect the electronic elements of the print heads and gantry controls.

Figure 17:
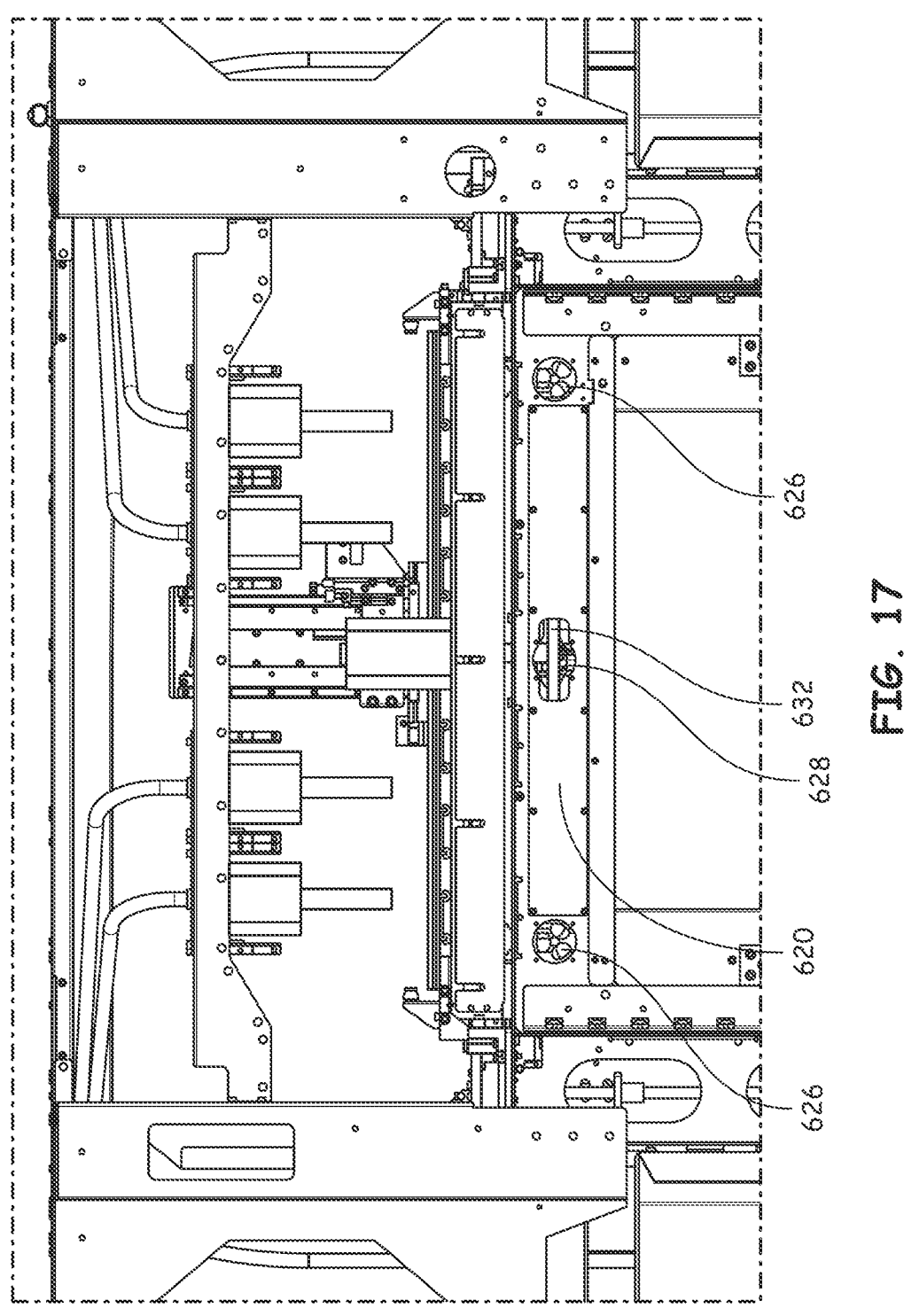
FIGS. 17-19 are illustrations of the calibration chamber with the print head positioned therein.
Figure 18:
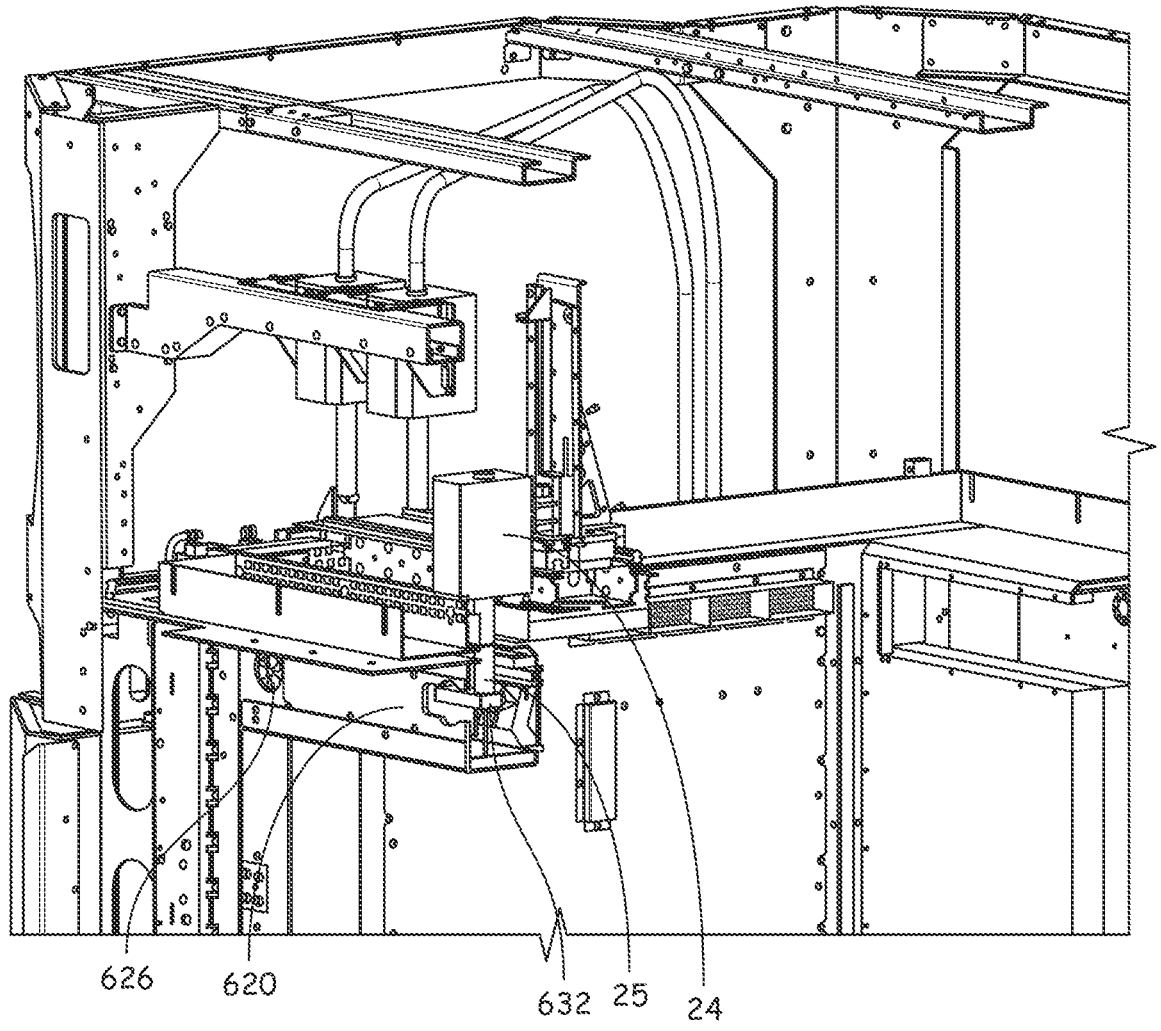
Figure 19:
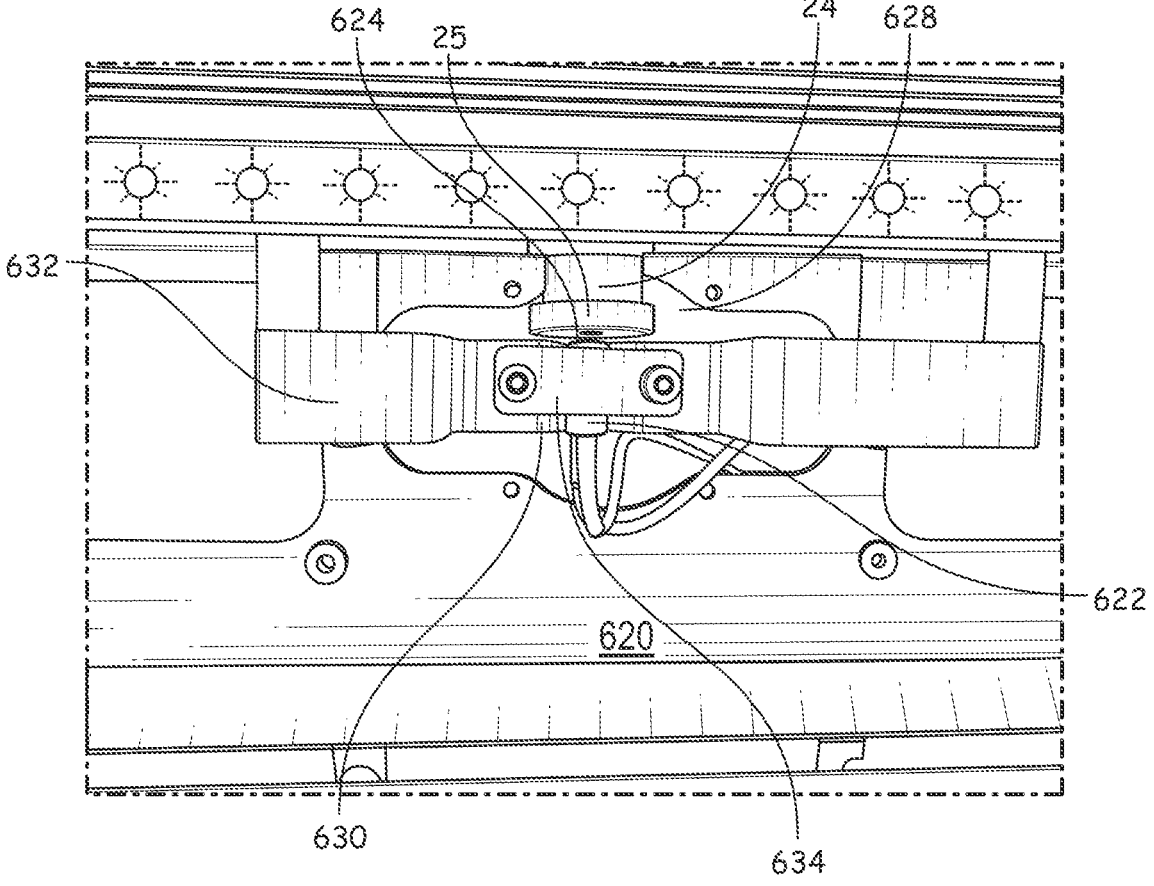

The calibration chamber 17 houses one or more sensors for sensing a location of a nozzle 25 of the print head 24, for example, an inductive sensor such as eddy current sensor 19 (as best illustrated in FIGS. 17-19) for finding a known location in x, y, and z of the nozzle 25. Nozzle calibration is done when swapping one print head for another in order to maintain accuracy in printing. When any kind of tool change is performed while a part is being printed, offsets between theoretical nozzle and tip orifice locations and actual nozzle and tip orifice locations may occur when a fixed relationship between the nozzle(s) and the tip orifice(s) with the part and/or support structures is not maintained. The eddy current sensor 19 generates high-frequency magnetic fields, and when a metallic nozzle is inserted into this magnetic field, the eddy current sensor uses a resulting change in oscillation to determine displacement of the nozzle from the sensor and thereby can generate a map of a tip of the nozzle from which a center of the nozzle tip can be derived. Mapping the nozzle tip allows the toolpaths to be adjusted or shifted for the unique location of each nozzle tip orifice relative to the center of the nozzle tip surface so that printing errors may be avoided.

The calibration chamber 17 is separated or partitioned from the heated chamber 16 is and located at a level below the tool chamber 18. The heated chamber 16 and the calibration chamber 17 are separated from the tool chamber 18 by a thermal barrier that spans the range of motion of the print heads 24. The print head 24 can individually access either the heated chamber 16 or the calibration chamber 17 by moving the print head 24 over a partition that separates the heated chamber 16 and the calibration chamber 17.

While two chambers are described and illustrated below the tool chamber, any number of separated or partitioned chambers can be located below the tool chamber and the thermal barrier such that the print head can access all of the separated or partitioned chambers. By way of non-limiting example, the 3D printer 10 can include a third chamber that is used to purge the print heads of material when restarting the printing process for the particular print head. Another chamber can include other sensors such as a touch probe sensor or optical sensor use to determine if there is build up on the nozzle. The separate chamber can also include a device or mechanism to clean the detected debris from the nozzle. Each of the chambers can be controlled at ambient, or elevated temperature conditions as desired.

The 3D printer 10 includes a print head carriage 26 which connects or couples to a selected tool or print head, with an x-y gantry 28 moving the carriage 26 and a selected print head in an x-y plane above a build plane such that the nozzle 25 is within the heated build chamber 16. The build plane is provided with a platen or platen assembly 30 (shown in FIGS. 4-5) within the build chamber 16, with the platen 30 being moved in a vertical z direction within the build chamber by a platen gantry 32. The tool chamber 18 and heated build chamber 16 are separated by a thermal insulator 20, described below in greater detail, which allows the carriage 26 to remain within the (unheated) tool chamber 18 while the nozzle 25 extends through the thermal insulator 20 into the heated build chamber 16, such that thermal isolation can be maintained between the build environment and the tool chamber 18.

In the exemplary embodiment of 3D printer 10, a print head 24 is shown engaged on a tool mount 27 of the carriage and has an inlet 23 for receiving a consumable build material and a nozzle 25 for dispensing the build material onto the platform in a flowable state. The consumable build material is provided to the print head from one or more filament spools 50 positioned within spool boxes 56a, 56b, 56c and 56d positioned on a side of the build chamber, and through filament guide tubes 54 extending from the spool boxes to the print head.

The building material is optionally and preferably in a filament form that is suitable for use in an extrusion-based additive manufacturing. The building material may be any extrudable material or material combinations, including amorphous or semi-crystalline thermoplastics, and thermosets, and may include fillers, chopped fibers, and/or a continuous fiber reinforcement. For example, appropriate polymers include, but are not limited to, acrylonitrile butadiene styrene (ABS), nylon, polyetherimide (PEI), polyaryletherketone (PAEK), polyether ether ketone (PEEK), polyactic acid (PLA), Liquid Crystal Polymer, polyamide, polyimide, polysulfone, polytetrafluoroethylene, polyvinylidene, and various other thermoplastics.

A fiber-reinforced filament may consist of one or more types of continuous fibers. The continuous fibers may be extended, woven, or non-woven fibers in random or fixed orientations and may consist of, for example, carbon fibers, glass fibers, fabric fibers, metallic wires, and optical fibers. The fiber-reinforced filament may also consist of short fibers alone or in combination with one or more continuous fibers. Appropriate fibers or strands include those materials which impart a desired property, such as structural, conductive (electrically and/or thermally), insulative (electrically and/or thermally), and/or optical. Further, multiple types of fibers may be used in a single fiber-reinforced filament to provide multiple functionalities such as electrical and optical properties.

As shown, the x-y gantry 28 is mounted on top of the build chamber, and in an exemplary embodiment comprises an x-bridge 60, y-rails 52, and associated x and y motors for moving and positioning the carriage 26 (and any build tool installed on the carriage) in an x-y plane above the build plane. The carriage is supported on the x-bridge and includes a mount 27 for receiving and retaining print heads and a local Z positioner 72 for controllably moving a retained print head out of the x-y build plane along a perpendicular z direction axis (e.g., not in a pivoting manner). The local Z positioner operates to move a retained print head in a limited Z band of motion from a build position to a tool change position. Additionally, in some embodiments may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

The local Z positioner also operates to move a newly retained print head over the tool chamber and into a calibration chamber 17 separate from the heated chamber 16 and tool chamber 18. The calibration chamber 17 includes the sensor 19 configured to calibrate a location of a nozzle tip surface 25 on the print head 24 in x, y and z. Once the print head is over the calibration chamber 17, the print head is lowered into the calibration chamber 17 proximate the sensor to sense the location of the nozzle tip surface 25.

Tool crib or rack 22 is located above the build chamber at a position reachable by the tool mount 27 when elevated by the local Z positioner 72. The tool mount may engage with and support a print head, and is used to retain and swap print heads provided in the rack. In general, any modular tools, such as print heads or any other tools (generally and collectively referred to below simply as "tools") that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40)

and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z-height within chamber 16, moving it in increments which represent the height of an individual part slice, typically 0.0050-0.020 inches in z-height. Controller assembly 38 may then direct x-y gantry 28 to move head carriage 26 (and the retained print head 24) around in the horizontal x-y plane above chamber 16, and direct the local Z positioner 72 to move the head carriage in smaller, or larger, incremental movements within the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 4:
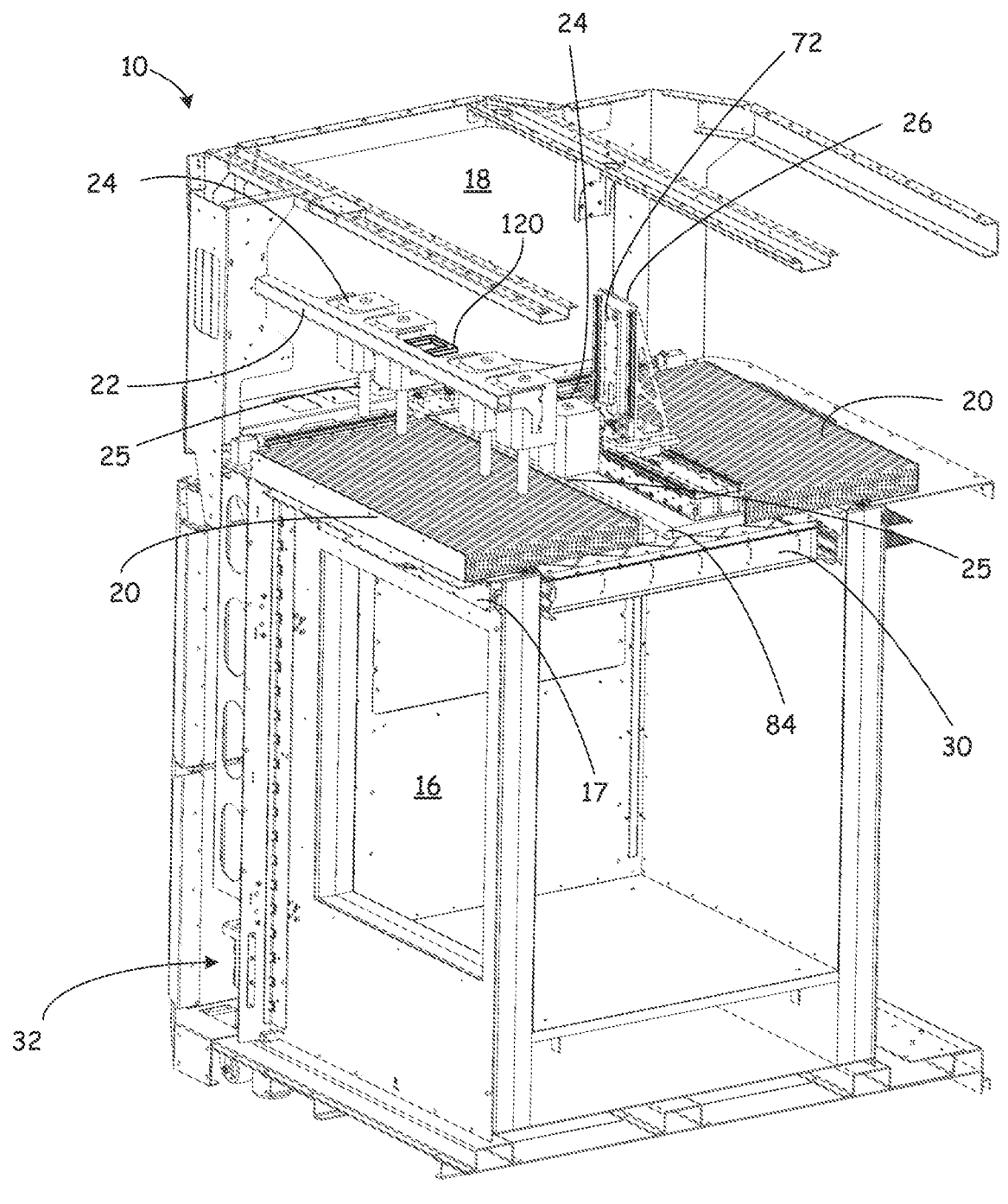

At the start of a build process, the build plane is typically at a top surface of the build platform or platen 30 (or a top surface of a build substrate mounted to the platen) as shown in FIG. 4, where the build platform is positioned to receive an extruded material from the nozzle 25 of the print head. A top surface of the sensor 19 and calibration block 632 in the calibration chamber 17 is substantially aligned with the top surface of the build platform or platen 30 as the print process is started such that the x, y and z positions of the nozzle 25 can be sensed in a z location that is aligned with the build plane during the printing of the part and associated support structure.

Figure 5:
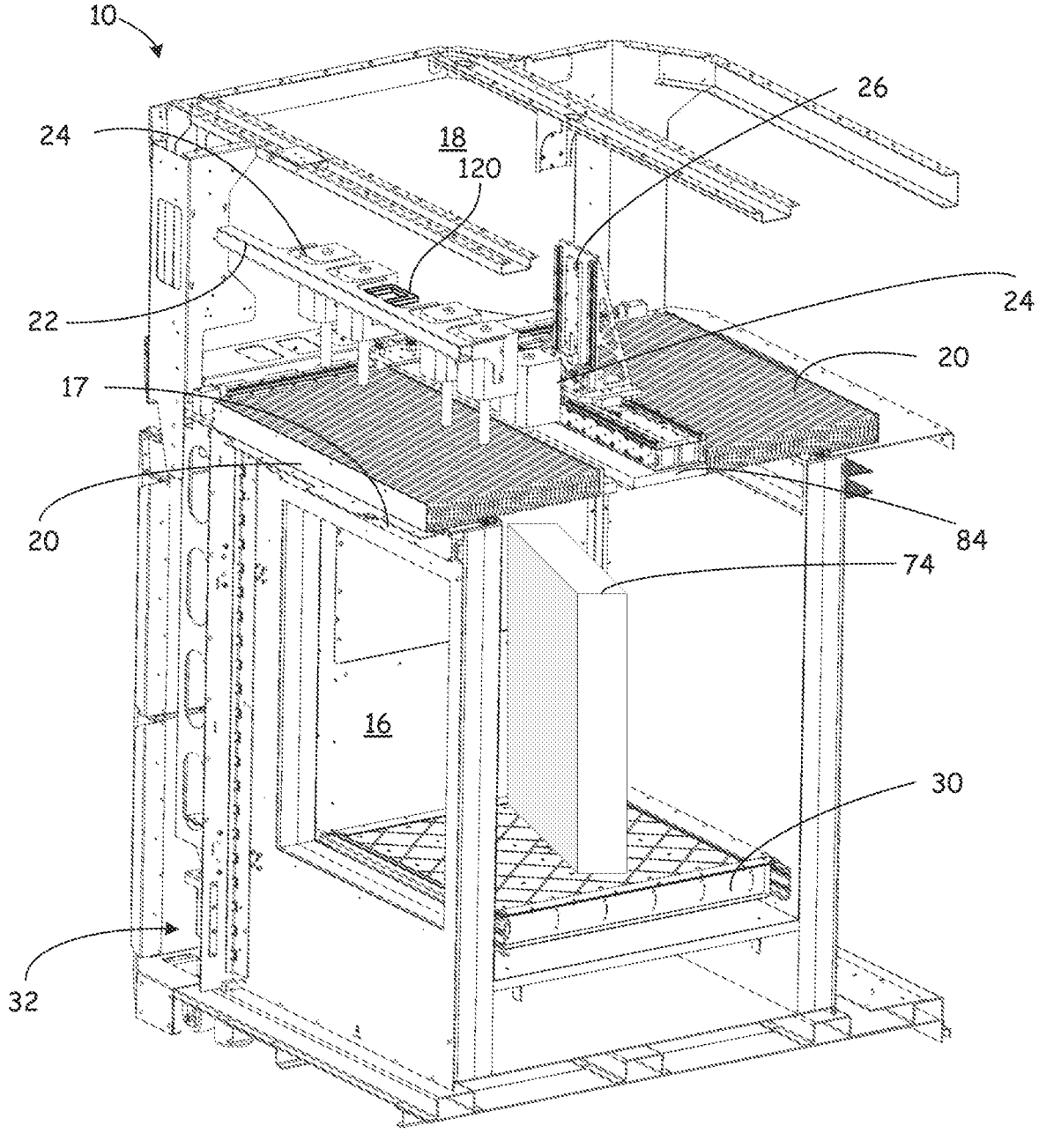
Figure 5A:
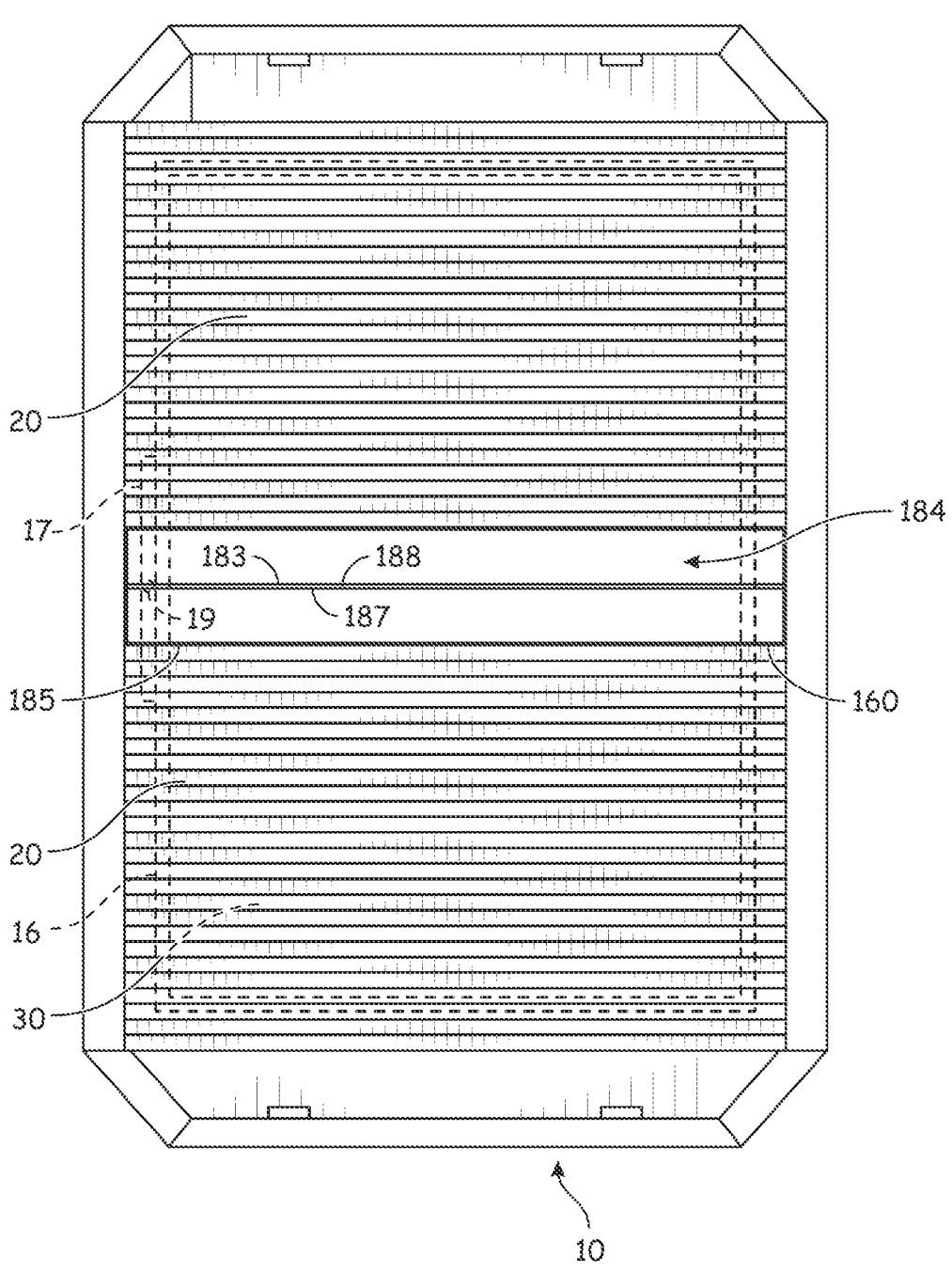
FIG. 5A is a top view of a thermal isolator between the heated chamber and the tool chamber.

As layers are built, the platen is indexed away from the build plane, allowing printing of a next layer in the build plane. The platen gantry 32, or primary Z positioner, moves the build platform away from the print plane in between the printing of layers of a 3D fabricated part 74 (shown in FIG. 5). One or more parts and associated support structures can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

As discussed, the build chamber 16 of the 3D printer typically is heated to provide a heated or ovenized build environment, such as in the case of FDM® 3D printers manufactured and sold by Stratasys, Inc. of Eden Prairie, MN. The heated build chamber is provided to mitigate thermal stresses and other difficulties that arise from the thermal expansion and contraction of layered build materials during fabrication, using methods such as are disclosed in U.S. Pat. No. 5,866,058. The insulator 20 shown in FIGS. 2-5 is a deformable or movable thermal insulator comprising pleated bellows which allows the x-y gantry to move the head carriage 26 and attached print head 24 to move in the x-y plane. An example of a deformable thermal insulator 20 which allows the x-y plane movement is disclosed in Stratasys U.S. Pat. No. 7,297,304, utilizing a pleated bellows in the x direction and another in the y direction. A roller style insulator or insulators may also be used, in place of a pleated bellows or in combination therewith. In the shown embodiment, a thermal insulator tray 84 or similar mechanism is provided between sections of the deformable insulator 20 to provide access for the nozzle 25 of the print head into the heated build chamber while aiding in insulating the build chamber from the tool chamber. The thermal insulator tray 84 allows the print head to move in the y-direction as the x-y gantry 28 moves the head carriage, and the sections of deformable thermal insulator 20 on either side of the thermal insulator tray move or deform as the head carriage is moved in the y-direction, to maintain the thermal insulation between chambers.

As discussed above, some embodiments of the present disclosure are directed to 3D printers having a print head carriage driven by an x-y gantry, with the print head carriage carrying a local Z positioner. This allows a print head or other tool carried by the print head carriage to be moved in the x, y and z directions by the print head carriage. Further, the x-y gantry and local Z positioner allow the tool mount of the carriage to be raised within the tool chamber to positions adjacent the tool rack to couple to a variety of individual print heads or tools. Further, the x-y gantry and local Z allows the print head to be moved beyond the print envelope of the heated chamber and above the separate calibration chamber 17 and lowered into the calibration chamber 17 such that the position of the nozzle 25 of the print head 24 can be determined in x, y and z by the sensor prior to restarting the printing after a tool change. The local Z positioner also allows the head carriage and tool mount to be lowered to positions with the nozzle of a print head extending into the heated build chamber while the remainder of the print head remains in the tool chamber.

Figure 6:
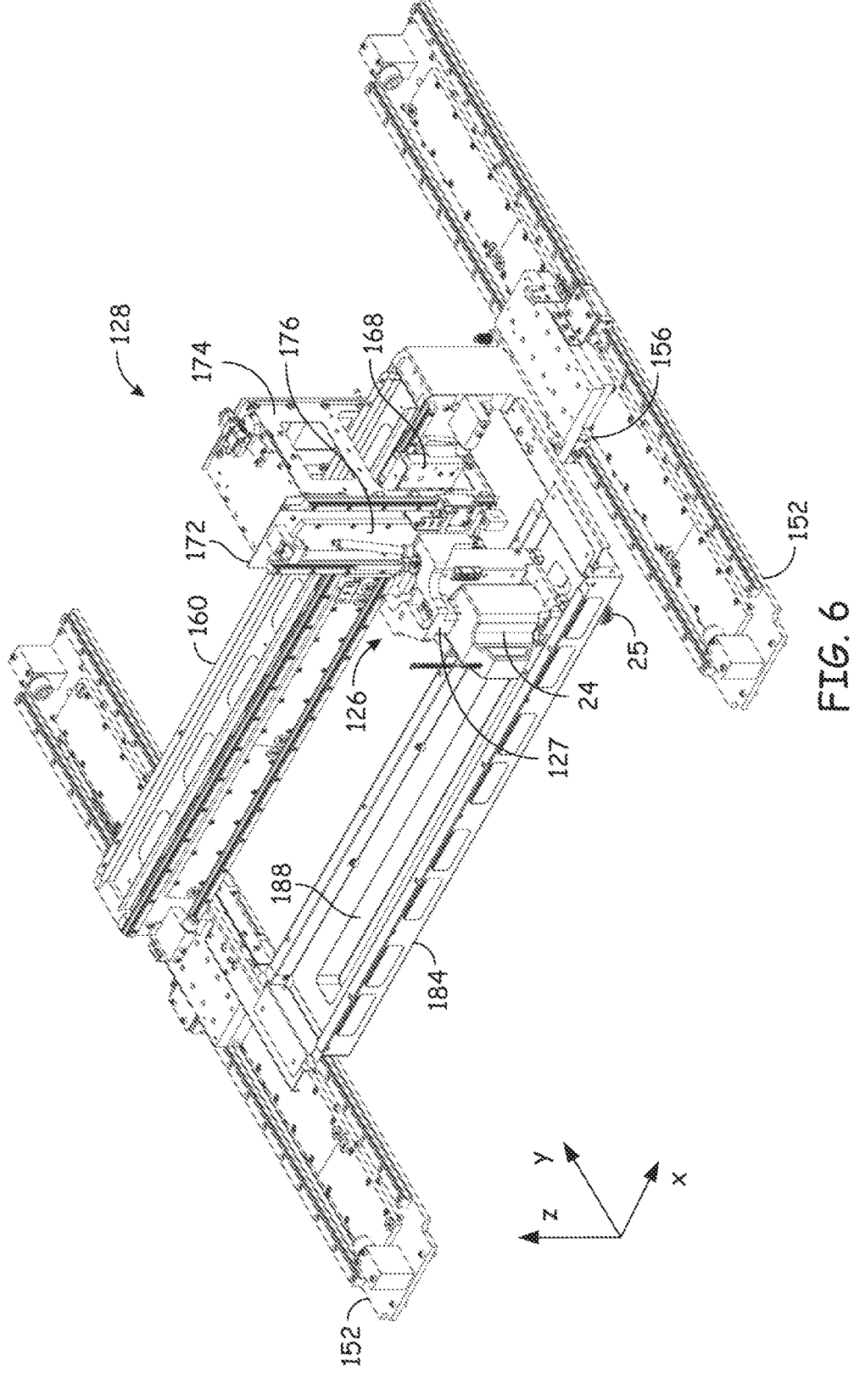
FIG. 6 is a perspective view of an x-y head gantry of exemplary disclosed 3D printers, with the x-y head gantry including a carriage with a mount and a local Z positioner in accordance with a first embodiment.

Referring now to FIG. 6, an example embodiment of an x-y gantry and a local Z positioner, which can serve as x-y gantry 28 and local Z positioner 72, are provided. The x-y gantry 128 shown in FIG. 6 is mounted on top of the build chamber (as shown in FIGS. 2-5), and includes an x-bridge 160, y-rails 152, and associated x and y motors 168 and 156 for moving and positioning a head carriage 126 and any build tool (e.g., a print head, subtractive head, instrumentation and detection devices) installed on the carriage in an x-y plane above the build plane. In exemplary embodiments, x and y motors 168 and 156 are linear motors, though other motors can be used in alternate embodiments. The carriage 126 is supported on the x-bridge 160 and includes a tool mount 127 for receiving and retaining print heads, and a local Z positioner 172 configured to controllably move a retained print head out of the x-y build plane along a perpendicular z direction axis (e.g., not in a pivoting manner). The local Z positioner 172 operates to move the print head in a limited z band of motion, and may be utilized while the carriage is moving in x-y or when it is in a fixed x-y position. In exemplary embodiments, the local Z positioner 172 utilizes a linear motor which allows the 3D printer to move the print head in the z direction while extruding build material from the print head. This in turn allows x, y and z movement of the print head to implement a toolpath, with the z movement of the print head allowing relatively small print head excursions in the z direction while printing in the x-y plane.

Local z positioner 172 includes a local Z bridge 174 which is moved in the x direction along the x-bridge 160 by one or more x linear motors 168. In this embodiment, the x-bridge extends 160 through the local Z bridge structure. The local Z bridge 174 includes or supports head carriage 126 having mount 127 and local Z positioner 172. Local z linear motor 176 of the local Z positioner moves the mount 127 and any attached print head 24 up and down in the z direction, perpendicular to the x-y plane of the build surface. Also as shown in FIG. 6, a thermal insulator tray 184 includes overlapping straps 183 and 185 secured on three sides to the x-bridge 160 and having free edges 187 that define a slot or central portion 188 through which a portion of nozzle 25 (and optionally other print head components such as a portions of a print head liquefier) of the retained print head 24 is inserted into, and extend into the build chamber of the printer when printing. As shown for example in FIGS. 2, 4, 5 and 5A an insulator 20, such as an insulating baffle, connects to both sides of thermal insulator tray 184 and forms a ceiling of the heated build chamber 16, the calibration chamber 17 and any other chamber(s) as needed, and the nozzle 25 of the engaged print head 24 extends through the slot or central portion 188 (via the thermal insulator tray 184) into the build chamber when the engaged print head is in the build position, into the calibration chamber when calibrating a nozzle of a newly swapped print head or any other chamber having different functionalities. The nozzle of the engaged print head is above the insulator or baffle when the engaged print head is in a tool exchange position where the insulator or baffle spans all of the partitioned chambers of the 3D printer. As the tool changer moves above and over the thermal insulator area within the tool chamber, the thermal insulator opening or slit access point moves with the print head and carriage, to allow an entry point into either the headed build chamber or the calibration chamber. By maintaining only a small slit area with an opening between the heated and unheated portion of the printer, less heat escapes into the tool chamber while still allowing a high level of accessibility to either area, and the sensitive electronics of the tool changer and gantry are kept cool in the unheated tool chamber.

In the embodiment shown in FIG. 6, the x-bridge is in a stacked arrangement positioned above the baffle and at a higher z elevation than the thermal insulator tray 184. Also in this embodiment, the local Z bridge 174 which forms or supports the head carriage has an opening such that the x-bridge 160 extends through the local Z bridge.

As will be discussed further, the local Z positioner can utilize a local Z linear motor to provide a local z direction range of motion of the mount 127 of carriage 126 to be raised to a position proximate a tool rack (e.g., tool rack 22 shown in FIGS. 2-5) to retrieve, return or exchange print heads or other tools. The provided range of motion in the local z direction also allows the print heads to be lowered such that tips of nozzles 25 are in position against or proximate the build surface within chamber 16 for advanced printing techniques, or for calibration and monitoring of the platen position, the x-y gantry, the local Z positioner, or other components and system and/or to be positioned within the calibration chamber 17 for determining the location of the nozzle on a print head being placed into service.

Figure 7:
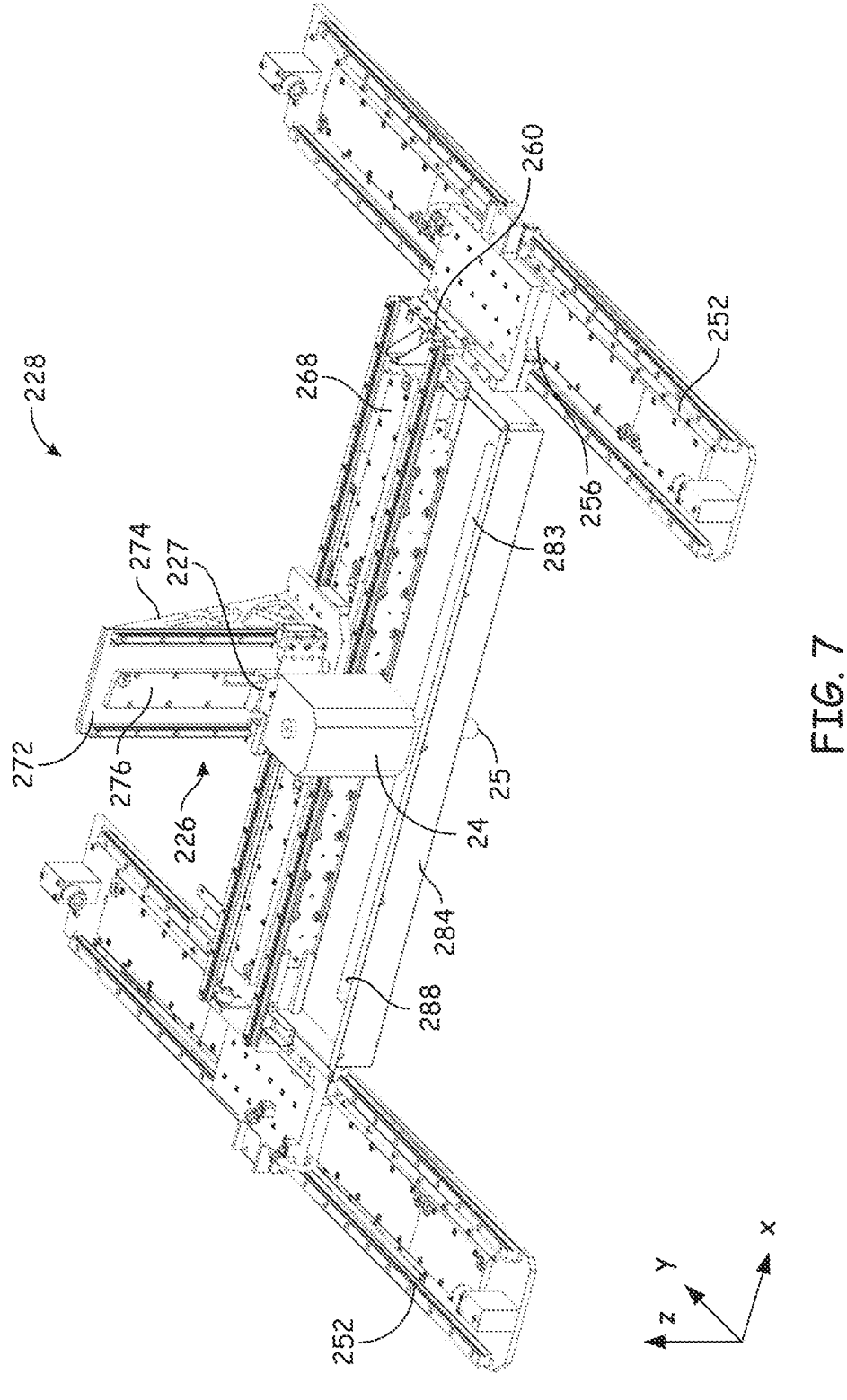
FIG. 7 is a perspective view of an x-y head gantry of exemplary disclosed 3D printers, with the x-y head gantry including a carriage with a mount and a local Z positioner in accordance with a second embodiment.

Referring now to FIG. 7, another example embodiment of an x-y gantry and a local Z positioner, which can serve as x-y gantry 28 and local Z positioner 72, are provided. In this embodiment, the x-y gantry 228 again includes an x-bridge 260, y-rails 252, and associated x and y motors 268 and 256 for moving and positioning a local Z bridge 274 which includes or provides the head carriage 226. Again, in exemplary embodiments, x and y motors 268 and 256 are linear motors, though other motors can be used in alternate embodiments. The carriage 226 of local Z bridge 274 is supported on the x-bridge 260 and includes a tool mount 227 for receiving and retaining print heads, and a local Z positioner 272 configured to controllably move a retained print head out of the x-y build plane along a perpendicular z direction axis. Like local Z positioner 172, local Z positioner 272 operates to move the carriage in a limited z band of motion, and may be utilized while the carriage is moving in x-y or when it is in a fixed x-y position. In exemplary embodiments, the local Z positioner 272 utilizes a linear motor 276 which allows the 3D printer to move the print head in the z direction while simultaneously extruding build material from the print head to print a part. This in turn allows x, y and z movement of the print head to implement a multi-z height toolpath, with the z movement of the print head allowing relatively small print head excursions in the z direction while printing in the x-y plane.

Also as shown in FIG. 7, a thermal insulator tray 284 includes overlapping straps 283 secured on three sides to the x-bridge 260 and having free edges that define a slot or central portion 288 through which a portion of nozzle 25 of the retained print head 24 is inserted into, and extend into the build chamber of the printer when printing. Similarly, the thermal insulator tray 284 extends above the calibration chamber 17 so that a nozzle can be lowered into the calibration chamber 17 at a selected distance above the sensor to determine the location of the nozzle of a newly swapped print head in x, y and z to minimize printing errors. Like thermal insulator tray 184, thermal insulator tray 284 is configured to have an insulator 20, such as an insulating baffle, connected to form a ceiling of the heated build chamber, and the nozzle 25 of the engaged print head 24 extends through the baffle (via the thermal insulator tray 284) into the build chamber when the engaged print head is in the build position. In this embodiment, the x-bridge 260 is adjacent, instead of above, the thermal insulator tray 284 to form part of the seal structure. The insulating baffle is then coupled to one side of the thermal insulator tray 284 and to the distant side of the x-bridge to form the insulated ceiling of the heated build chamber. Also, in this embodiment, in order to reduce the effects of any rotational movement at the x-linear motor bearing on the degree of displacement at the tip of the mount 227, instead of extending the x-bridge through the local Z bridge structure, the x-linear motor 268 (e.g., magnets, rails) and the structure of the local Z bridge 274 are positioned on top of the x-bridge 260B. This configuration reduces the tip deflection effects of torque or rotation.

In exemplary embodiments utilizing x, y and z linear motors, the linear motors provide a high-performance print head gantry (x-y gantry) and "local Z" positioner. The local Z positioner is of low mass and stiff enough to perform functions such as extruding in non-planar toolpaths, and elevating the print head carriage to reach an overhead head tool rack for loading and exchanging print heads while maintaining positional accuracy at the build layer location. For example, with an extruder print head weight of less than 2.5 lbs. and a linear z motor weight of approximately 1.3 lbs., a total local Z positioner mass of only approximately 14 lbs. (including a magnet track, bearings, structure, encoder, energy chain, etc.) can be achieved. With a zero hysteresis and high acceleration linear motor, and with low friction, this allows high speed precision control of the print head, and thus, highly accurate toolpath deposition placement.

Consistent print head tip location is mandatory in order to create accurately printed parts. If the tip location varies, the part geometry will not be accurate. Each time that print head is swapped from the tool changer, the potential for print head tip location variation is introduced, because the print head might be in a slightly different position, or some type of positional hysteresis may have occurred, or because each print head is microscopically different in size. Because slice heights can be as small as 0.5 mm, small variations lead to printed part errors or failures if not accommodated for. The local z positioner allows for a consistent and precise way of maintaining print head tip position, while also providing a high level of accuracy for local z movements beyond the typical movement of the primary z platen gantry. Because of that precise and accurate locational control, two performance functions are enabled—1) printing an individual part using more than one particular print head during the build, and 2) extruding material to print a particular part layer while moving the print head height in z. Both of these functions are typically require very accurate and precise knowledge and control of the print head tip location.

In exemplary embodiments, the local Z linear motor provides the ability to make micrometer-scale movements of the print head, up and down in the z direction, beyond the platen gantry (primary) z movement location, without any hysteresis using integral one micrometer (1 μm) scale feedback. For example, using a linear encoder with a 1 micron resolution, sub-four micrometer movements can be made with 3 microns of following error. This feedback, along with the linear motor with low friction, allows for precision control of the print head tip location. Having no (zero) compliance between the feedback device and the moving mass of the print head and carriage is an advantage provided by the use of linear motors. Using the disclosed embodiments, there is no need to account for lost motion or compliance between a static motor and an end effector, for example as produced by ball screws, belts, etc. The precise positioning and feedback provided by the local Z linear motor facilitates highly accurate toolpath control with small excursions in the z direction, as well as calibration, monitoring and control of components and systems of disclosed printers such as 3D printer 10. For example, the capability to move local Z height within a toolpath layer while extruding material for a printed layer enables an ability to create overlapped start and end joint seams, sometimes referred to as scarf seams, instead of creating abutted end joints. Such seams provide additional layerwise strength to built parts. Scarf scams also provide the potential to greatly reduce any potential bulging of the width of the overall seam region, which can otherwise create shape variation in a part. In addition, using the x, y and local Z linear motors provides precise tip position information. The local Z unit allows for print head tip location calibration activities—to sense contact with the build surface facilitates calibration of the platen and system, by allowing the controller assembly 38 (shown in FIG. 1 and included in all disclosed 3D printer embodiments) to locate or determine the zero position for the platen gantry and platen; also, the local z unit can be used to monitor upward forces on the nozzle tips while printing to detect overfill and curl, etc. As linear motors can be back driven by loads or forces on the tip of the print head nozzle, the loads can be sensed by controller assembly 38 and the print head and local Z linear motor can be used as a touch probe to measure set platen level, or other system parameters.

Referring now to FIGS. 8-11, shown is another 3D printer embodiment having certain features as discussed above. The 3D printer 400 is illustrated with various components, such as some or all of the frames or cabinets 412 housing the heated build chamber 416 and tool chamber 418, removed to allow more detailed illustration of x-y gantry, local Z positioner and tool change features. These features, and others such controller 38 or various features shown in FIGS. 1-5A illustrating 3D printer 10, can also be included in 3D printer 400 and the present disclosure should be understood to disclose such features with reference to 3D printer 400.

Figure 8:
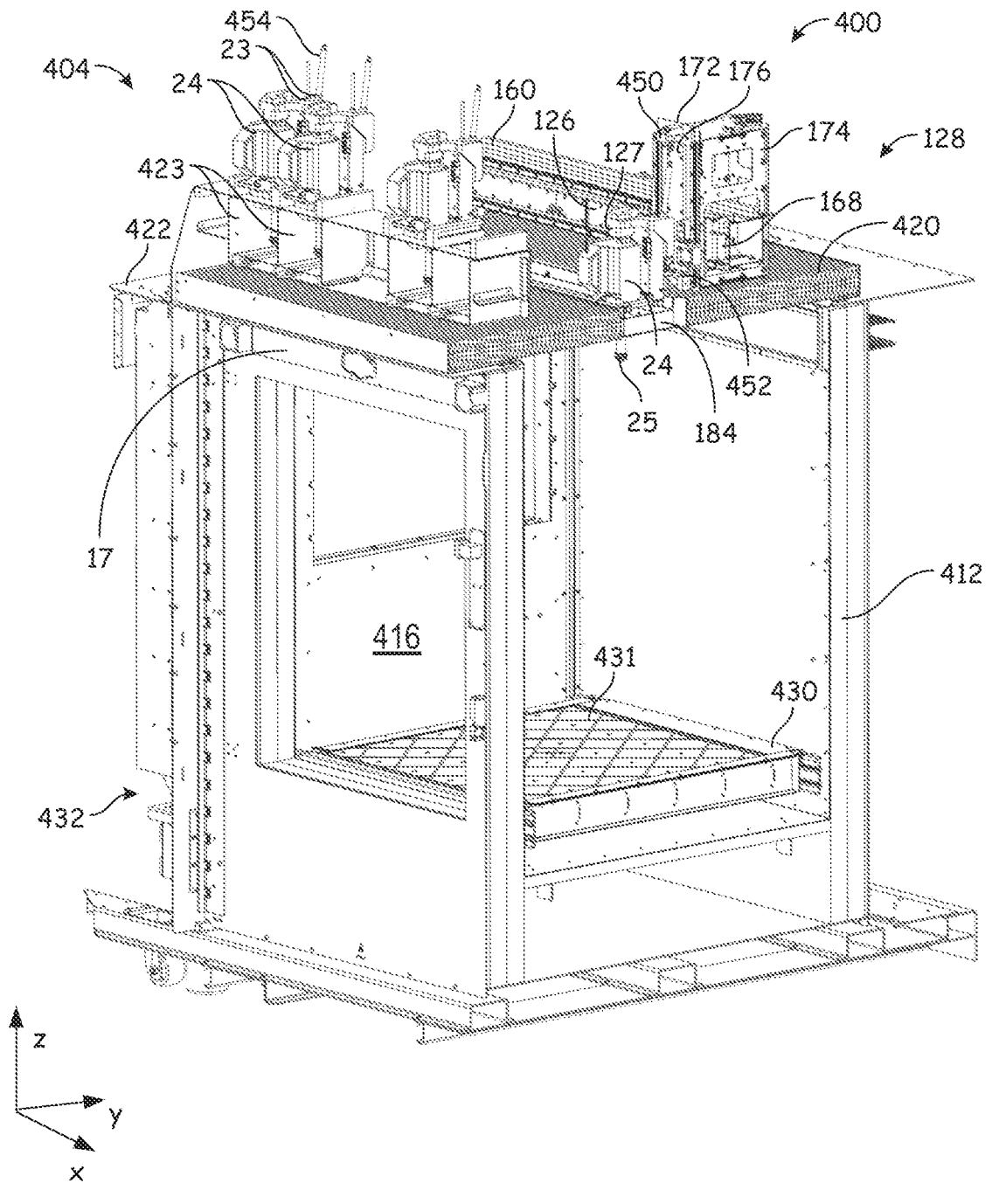
FIGS. 8-11 are illustrations of another exemplary 3D printer embodiment.

As shown partially in FIG. 8, 3D printer 400 includes system cabinet or frame 412 providing a heatable chamber 416 in which a platen 430 of a platen system is positioned to provide a build surface 431. The build plane of surface 431 lies in a substantially horizontal x-y plane, and the platen 430 is moved in a z direction substantially normal to the substantially horizontal x-y build plane by one or more actuators 434 of a platen gantry 432 (primary z positioner). In FIG. 8, platen 430 and build surface 431 are shown in a lowered position for illustrative purposes, but with print head 24 in a lowered position for printing within the heated build chamber 416 as discussed below, the platen gantry 432 will ordinarily have the platen and build surface raised such that a top layer of a part being fabricated is positioned to allow nozzle 25 of the print head to extrude a next layer onto the part.

In this particular embodiment, 3D printer 400 includes the x-y gantry 128 (shown in FIG. 6) positioned on top of the build chamber 416, with insulator 420 positioned between the tool chamber 418 (shown without a frame or cabinet for illustrative purposes). As such, x-y gantry 128 of 3D printer 400 includes an x-bridge 160, y-rails 152 (shown in FIGS. 9-10 which have insulator 420 removed for illustrative purposes). Associated x and y motors 168 and 156 shown in FIG. 9 move and position head carriage 126 and any build tool (e.g., a print head, subtractive head, instrumentation and detection devices) installed on the carriage in an x-y plane above the build plane. In exemplary embodiments, the x and y motors are linear motors as discussed further below. The carriage 126 is supported on the x-bridge 160 and includes tool mount 127 for receiving and retaining print heads, and local Z positioner 172 configured to controllably move a retained print head out of the x-y build plane along a perpendicular z direction axis (e.g., not in a pivoting manner). The local Z positioner 172 operates to move the carriage in a limited z band of motion, and may be utilized while the carriage is moving in x-y or when it is in a fixed x-y position. In exemplary embodiments, the local Z positioner 172 utilizes a linear motor which allows the 3D printer to move the print head in the z direction while extruding build material from the print head. This in turn allows x, y and z movement of the print head to implement a toolpath, with the z movement of the print head allowing relatively small print head excursions in the z direction while printing in the x-y plane.

Local Z positioner 172 includes local Z bridge 174 which is moved in the x direction along the x-bridge 160 by one or more x linear motors as discussed above. The local Z bridge 174 includes or supports head carriage 126 having mount 127. Linear motor 176 of the local Z positioner moves the mount 127 and any attached print head 24 up and down in the z direction, perpendicular to the x-y plane of the build surface.

Figure 11:
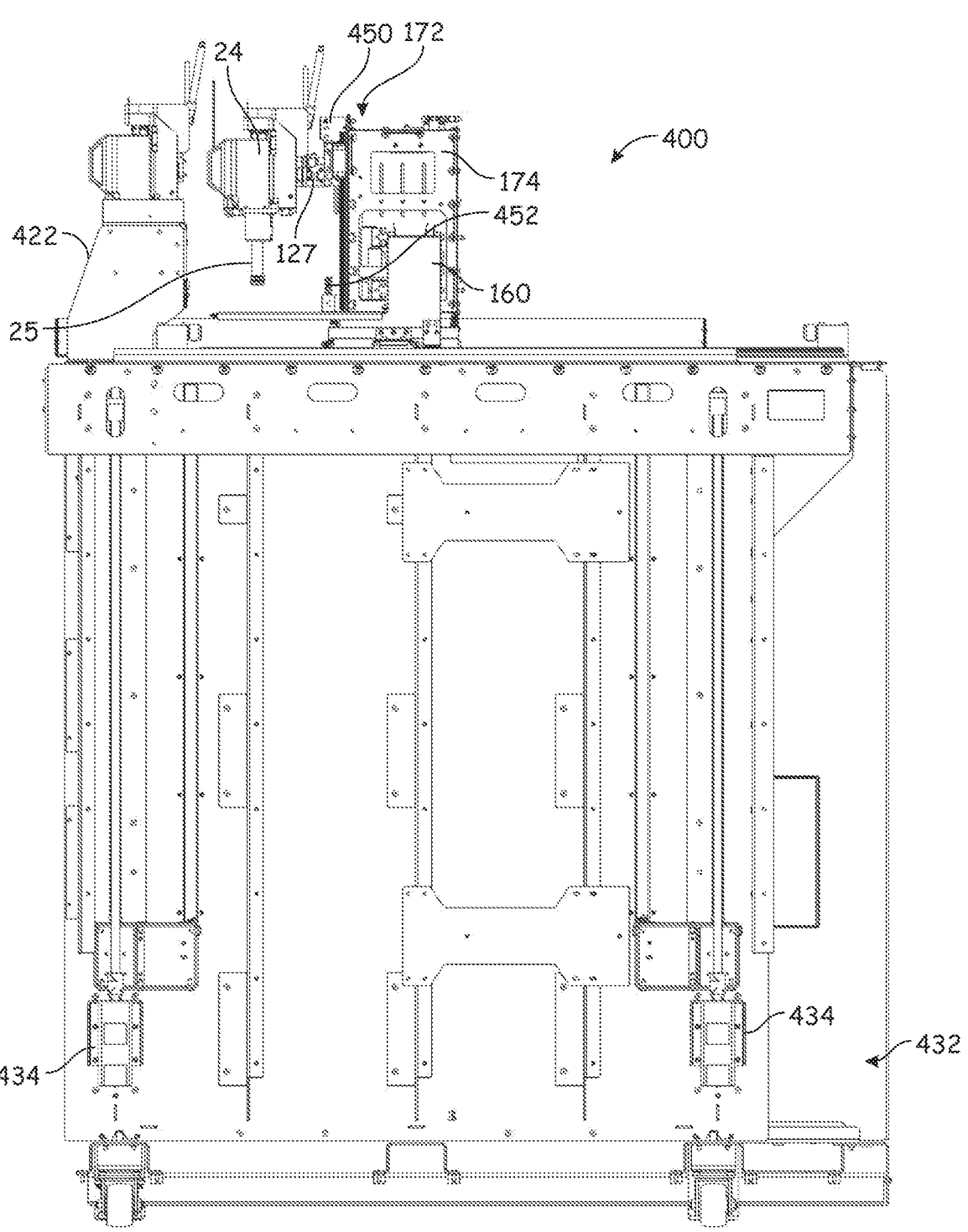

As shown in FIG. 8, thermal insulator tray 184 discussed above with reference to FIG. 6 includes a slot or central portion through which a portion of nozzle 25 (and optionally other print head components such as a portions of a print head liquefier) of the retained print head 24 is inserted into the build chamber of the printer when printing or inserted into the calibration chamber 17 and above the sensor after a print head is swapped into service. Insulator 420, such as an insulating baffle, connects to both sides of thermal insulator tray 184 and forms a ceiling of the heated build chamber 416, the calibration chamber 17 and any additional partitioned chambers that provide different functionalities and the nozzle 25 of the engaged print head 24 extends through the baffle (via the thermal insulator tray 184) into the build chamber when the engaged print head is in the build position. As shown in FIG. 11, the nozzle of the engaged print head is above the insulator or baffle when the engaged print head is in a tool exchange position.

At the start of a build process, the build plane is typically at a top surface of the build platform provided by platen 430 (or a top surface of a build substrate mounted to the build platform), where the build platform is positioned to receive an extruded material from the nozzle 25 of the print head 24. The top surface of the sensor in the calibration chamber 17 is substantially aligned with the top surface of the build platform at the start of the build process. As layers are built, the platen 430 is indexed away from the build plane by the platen gantry or primary Z positioner 432, allowing printing of a next layer in the build plane. The primary Z positioner moves the build platform away from the print plane between layers (while printing is paused). This incrementing creates the height of the next print layer, or slice.

Alternatively, in some embodiments, at the start of a build process, the primary Z positioner positions the platen at an initial position lower than a nominal build plane, and the local Z positioner positions the nozzle of the print head to print near the bottom of the local Z positioner stroke range. This allows the primary Z position of the platen to be started at a lower height. Once the local Z print position reaches and prints at its nominal build height, the primary Z positioner begins to move the platen down by the height of a slice or layer, with the print head printing at the local Z nominal build height, during the remainder of the build. Some advantages of this process include that it prevents, or reduces, the platen from blocking airflow from the oven exhaust, while giving the user and any monitoring camera system a better view of the part start since the platen is lower and out of the way.

The print heads 24 are removably coupled to carriage 126 by mount 127, and have an inlet 23 for receiving a consumable build material through filament guide tubes 454. Only a portion of filament guide tubes are shown in FIG. 8, but it should be understood that the guide tubes can extend from the filament supply (e.g., spools mounted to a spindle, spool boxes, canisters, cartridges, etc.) to the print head, as discussed with reference to 3D printer 10. Although not illustrated in detail, those of skill in the art will understand that print heads 24 can include a liquefier which provides the nozzle 25 for dispensing the build material onto the build surface or platform in a flowable state. Those skilled in the art will also recognize that other types of consumable supplies and other form factors of consumables may be utilized in practicing the inventions disclosed herein, including without limitation pellets feeding a print head that utilizes a screw extruder such as disclosed in Stratasys (Bosveld) U.S. Pat. No. 8,955,558, and with or without the use of guide tubes.

In FIGS. 8-11, multiple print heads are shown positioned in bins 423 of a tool crib or tool rack 422, of a tool changer system 404, configured to store multiple print heads above the build chamber 416, outside the heated region. Tool changer system 404 and tool rack 422 can be any suitable system and tool storage structure, for example such as the tool changer systems and structures disclosed in U.S. Pat. Nos. 7,625,198; 7,939,003; 9,481,132; 9,469,072 and 10,214,004, which are herein incorporated by reference in their entirety. In exemplary embodiments, each of the multiple print heads includes a tool connector 490 (shown in FIG. 10) configured to connect and disconnect with tool mount 127 on carriage 126 in response to commands from the controller. A robotic tool changer having two mating parts may be utilized for the tool connectors 490 and tool mount 127, for example a tool-side and master-side end-effector in the QC-7 Series sold by ATI Industrial Automation of North Carolina and designed to lock together automatically, carry a payload, and pass utilities such as electrical signals. Each of the tools in the tool crib 422 are electrified, making them able to perform activities or communication functions at all times.

Figure 9:
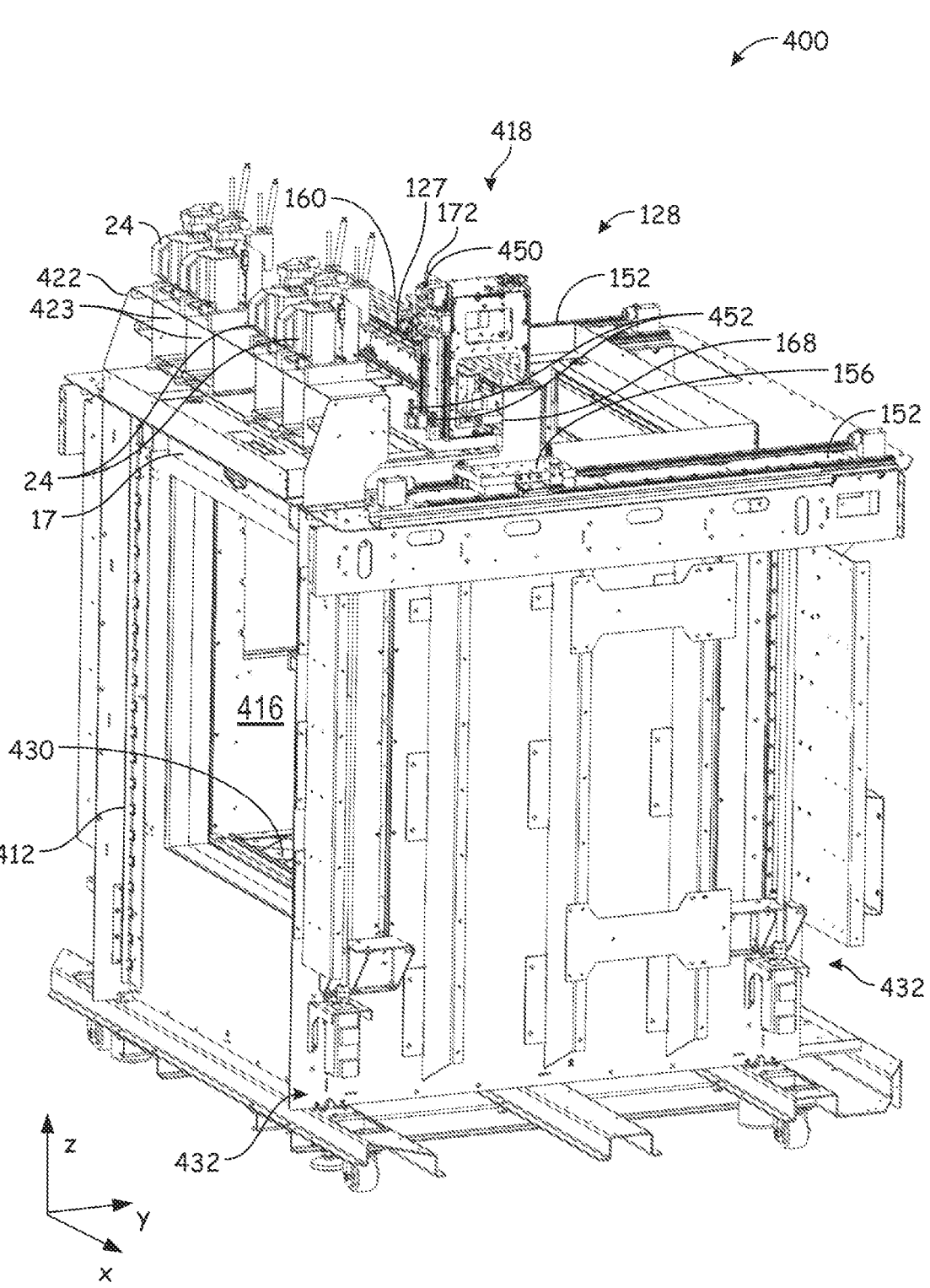
Figure 10:
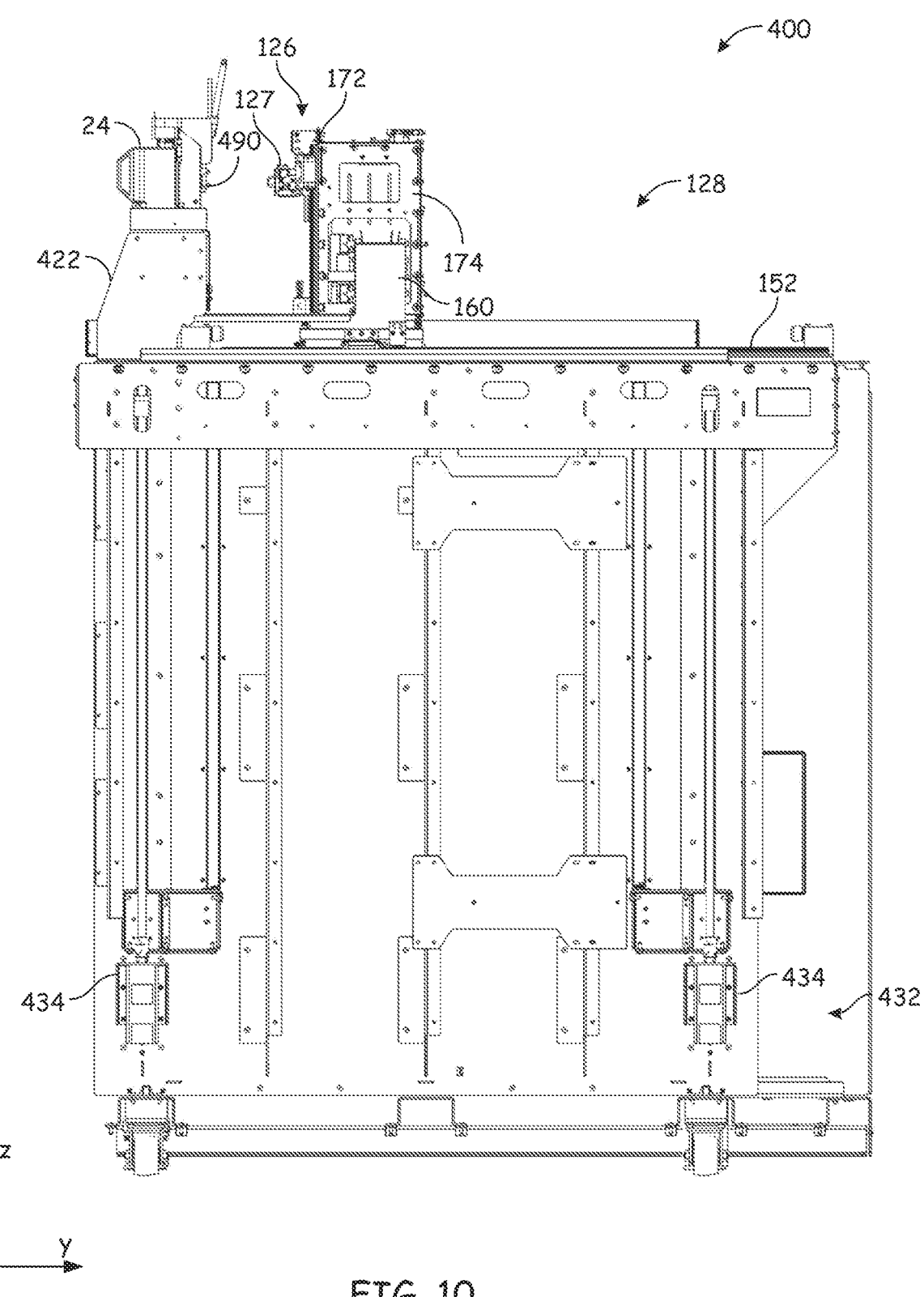

As will be discussed further, the local Z positioner 172 utilizes the local Z linear motor 176 to provide a local z direction range of motion of the mount 127 of carriage 126 to be raised to a position proximate tool rack 422 to retrieve, return or exchange print heads or other tools from bins 423. FIGS. 9 and 10 illustrate mount 127 in a raised position and without a print head attached. With the mount raised by the z linear motor 176, the x linear motor 168 is controlled to position the mount 127 in front of the particular bin 423 of tool rack 422 where a print head 24 or tool to be retrieved is stored. A y linear motor 156 can then move the head carriage and mount 127 in the y direction such that mount 127 couples to tool connector 490 of the print head. After coupling the mount 127 to the print head, the y linear motor moves the head carriage and print head along the y axis and away from the tool rack 422 as shown in FIG. 11. The provided range of motion in the local z direction also allows the print heads to be lowered such that tips of nozzles 25 are in position against or proximate the build surface within chamber 416 for printing, or for calibration and monitoring of the platen position, the x-y gantry, the local Z positioner, or other components and system. The provided range of motion also allows the print head and nozzle to be positioned into the separate calibration chamber 17 and above a calibration sensor to determine the position of the nozzle 25 in the x, y and z directions. The print head can also be moved to another chamber or to the heated chamber by moving the print head in the z direction such that the tip surface of the print head exits above the partition and then moved in the x-y direction within the unheated tool chamber to above another desired chamber, and then lowered into the other chamber through the thermal insulator slit entry point, either to print a part or to provide an additional functionality to the print head. Although the platen 430 is shown in a lowered position for illustrative purposes, this lowered print head position is illustrated in FIG. 8.

In order to allow the z linear motor 176 to rapidly move the head carriage 126 and any retained print head within the local Z range of motion, for fast tool change operations or for movement of the print head in the z direction while printing, the local Z positioner can include features which quickly stop or dampen movement of the mount/print head at the upper and/or lower bounds of local Z range of motion. As shown in FIGS. 8-11, a bumper 450 is included on the local Z bridge 174 of local Z positioner 172. Bumper 450 is positioned to be contacted by mount 127 or other components when the local Z linear motor moves the mount to its upper most local Z position. One or more springs 452 are positioned on the local Z bridge 174 at a location near the lower most local Z range of motion. When the local Z linear motor is powered, motor movement can be dampened by the motor itself, through the controller and closed loop control (as can be the case with the X and Y motors). The one or more springs 452 perform this dampening function when the motor power is lost and the motor falls due to gravity. In embodiments in which a single spring is used, the spring can be longer and start making contact earlier so as to better dampen the load if/when the local Z linear motor falls due to power loss or drive fault. Another primary function of the one or more springs 452 is to compensate for the mass of the local Z positioner itself, plus the mass of the extruder when a print head is attached. Using this technique, there is almost no motor current required to hold up the mass while printing and as a result almost all the motor force/current can be used for the printing process. As the local Z positioner will typically spend over 90% of its operational time in a printing position with the print head printing, the one or more springs 452 also help improve motor life (reduces motor temperature).

Figures 13, 14:
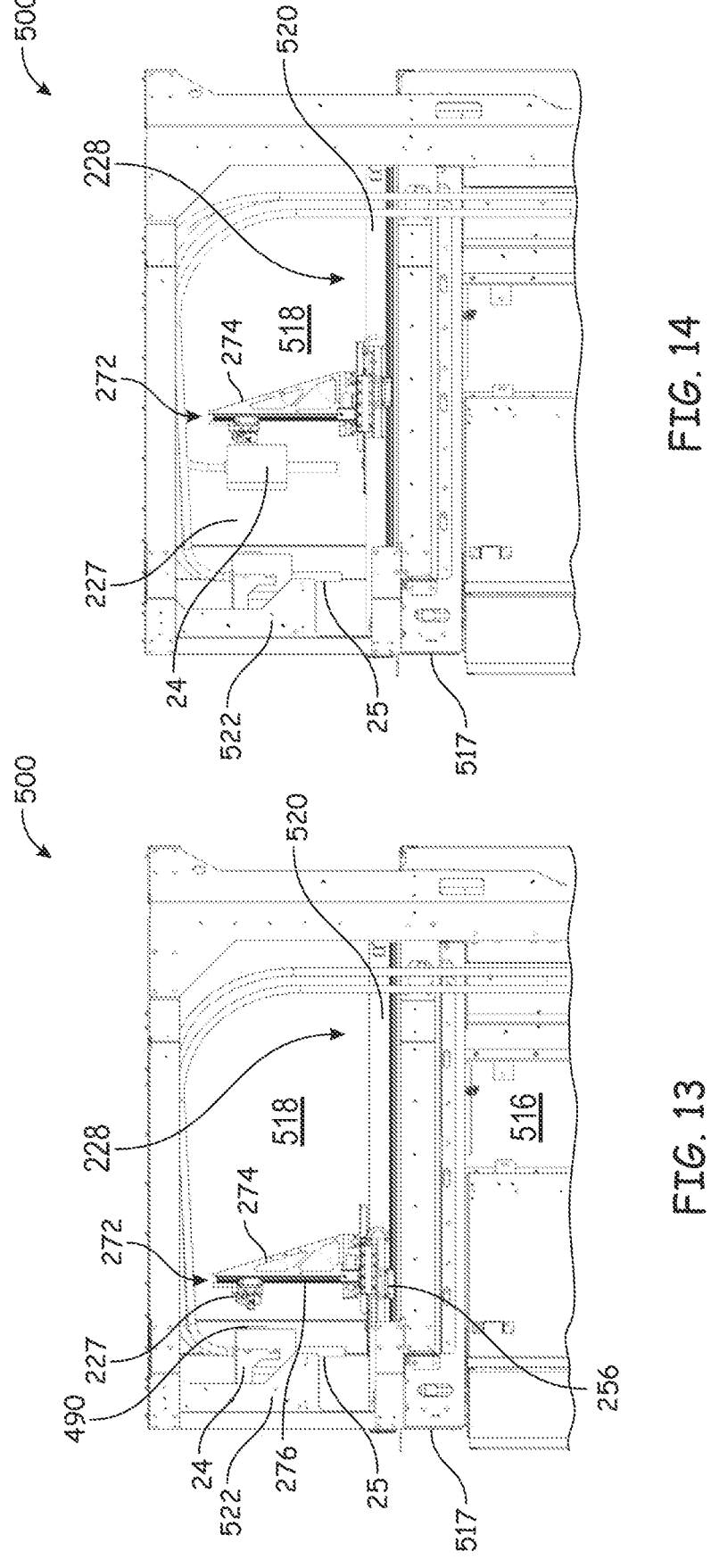
FIGS. 13-15 are illustrations of a printer showing carriage and print head positions for the steps of the method shown in FIG. 12.
Figure 15:
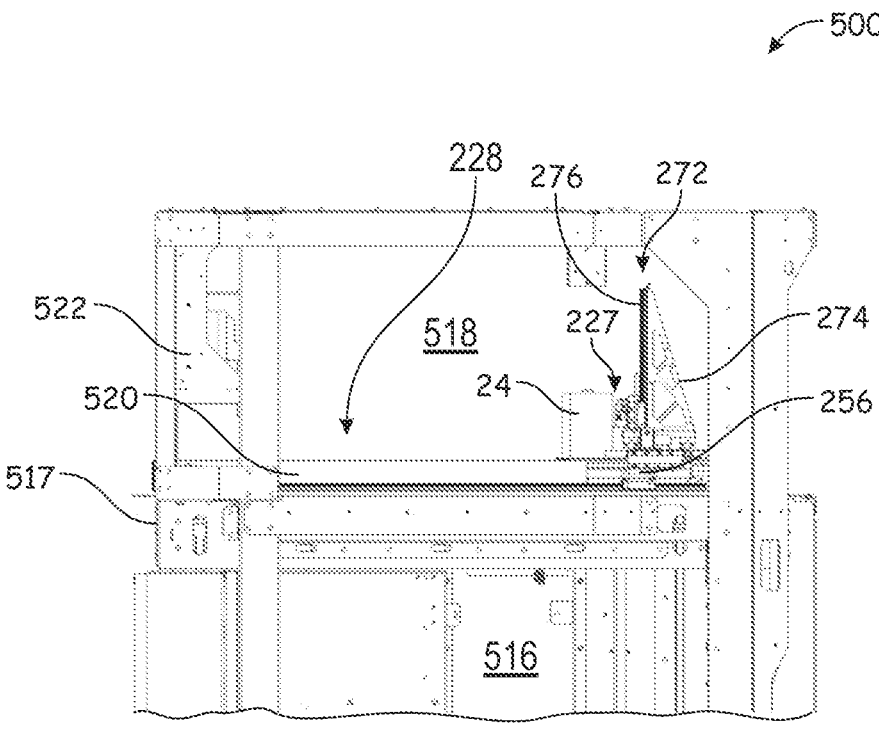

Referring now to FIG. 12, shown is a block diagram illustrating a method 600 of printing a 3D part using a 3D printer having a heated build chamber, a separate tool chamber, and a thermal insulator positioned between the build and tool chambers. The method 514 is described with reference to a printer 500 shown in FIGS. 13-15. Printer 500 includes a build chamber 516, a tool chamber 518 separated from the build chamber by an insulator 520, and an x-y gantry 228 and local Z positioner 272 of the types shown in FIG. 7. In the side views of FIGS. 13-15, the y motors 256 of the x-y gantry are shown, but the x motors 268 are not visible. As discussed above with reference to FIG. 7, the carriage 226 has a local Z bridge 274 which includes a tool mount 227 which can be moved by a Z motor 276 in a local Z range of motion.

As shown at block 502, method 514 includes using the local Z positioner of the print head carriage to move the tool mount 227 in the z-direction to a tool exchange z position of a bin of a tool rack 522 which retains a print head in the tool chamber 518. As shown at block 504, the method also includes moving the print head carriage, to a first position in an x-y plane within the tool chamber using the x-y gantry, with the first position in the x-y plane being adjacent the bin in which the print head 24 to be engaged is retained. These steps are represented by the head carriage position illustrated in FIG. 13.

Method 514 also includes the step shown at block 506 of engaging the print head 24 in the bin with the tool mount 227 of the print head carriage. After the print head has been engaged by the tool mount, the print head carriage and print head are moved to a second position in the x-y plane as shown at block 508 in FIG. 12. The results of this step are represented by the head carriage position illustrated in FIG. 14.

Method 514 also includes the step shown at block 510 of using the local Z positioner to move the tool mount and engaged print head in the z direction to a build position at which the nozzle 25 of the engaged print head extends from the tool chamber 518 through the insulator 520 and reaches an x-y build plane within the build chamber. The results of this step are represented by the head carriage position illustrated in FIG. 15. Then, the method includes the step shown at block 512 of extruding consumable material through the nozzle of the print head and into the build chamber with the engaged print head at the build position to build the 3D object. While extruding, the x-y gantry moves the print head along the desired tool path, and in some embodiments the local Z positioner 272 concurrently moves the print head comparatively smaller distances in the z direction, as further described below.

Referring now to FIG. 16, shown is a block diagram illustrating a method 601 of printing a 3D part using a 3D printer having a heated build chamber, a separate tool chamber, a separate calibration chamber and an insulator positioned between the build and calibration chambers and tool chambers. The method 601 is described with reference to a printer 500 shown in FIGS. 13-15, as described above.

As shown at block 602, method 601 includes using the local Z positioner of the print head carriage to move the tool mount 227 in the z-direction to a tool exchange z position of a bin of a tool rack 522 which retains a print head in the tool chamber 518. As shown at block 603, the method also includes moving the print head carriage, to a first position in an x-y plane within the tool chamber using the x-y gantry, with the first position in the x-y plane being adjacent the bin in which the print head 24 to be engaged is retained. These steps are represented by the head carriage position illustrated in FIG. 13.

Method 601 also includes the step shown at block 604 of engaging the print head 24 in the bin with the tool mount 227 of the print head carriage. After the print head has been engaged by the tool mount, the print head carriage and print head are moved to a second position in the x-y plane as shown at block 605 in FIG. 16. The results of this step are represented by the head carriage position illustrated in FIG. 14.

Method 601 also includes the step shown at block 606 where the nozzle is optionally heated. Optionally, the local Z positioner can be used to move the tool mount and engaged print head in the z direction to a build position at which the nozzle 25 of the engaged print head extends from the tool chamber 518 through the insulator 520 and reaches an x-y build plane within the build chamber. The results of this step are represented by the head carriage position illustrated in FIG. 15. Another option is to heat the nozzle while mounted in the tool rack.

After the tip is heated in block 606, the local Z positioner moves the print head from the tool chamber and into the calibration chamber above the sensor in the calibration chamber in block 607. The sensor then senses the nozzle tip to determine the position of the tip surface in x, y and z such that positioning errors can be identified in block 608. The print head and sensor are then returned to the heated chamber at step 609 and the method includes the step shown at block 610 of extruding consumable material through the nozzle of the print head and into the build chamber with the engaged print head to build the 3D object. While extruding, the x-y gantry moves the print head along the desired toolpath, and in some embodiments the local Z positioner

272 concurrently moves the print head comparatively smaller distances in the z direction, as further described below.

The calibration chamber 620 and the sensor 622 are illustrated in FIGS. 17-19. The calibration chamber 620 (17, 517 in FIGS. 1-15) is separate from the heated chamber 16 and the tool chamber 18. The calibration chamber 620 can include fans 626 and an exhaust port 628 to actively cool the sensor 622. The temperature of sensor 622 is monitored and maintained substantially constant utilizing a temperature sensor 623, as the sensor readings can fluctuate with temperature and will not provide an accurate calibration if the sensor temperature is not compensated or is allowed to drift.

The sensor 622 includes a top surface 624 that is substantially aligned with the top surface of the platen when the platen is positioned to initiate the start of the build process. A metal z-height calibration block 632 is ideally installed within the printer at a location that can allow for identification of the platen height at the beginning of a part build, and throughout the build process-known as the z-height of the xy print plane. The sensor 622 in the printer is retained within a cavity 630 of the block 632 with a strap 634 that spans the cavity 630 and retains the sensor 622 in a fixed location. The mass of the block 632 dampens vibrations and aids in retaining the sensor 622 in the fixed location within the calibration chamber 620. The block 632 can be constructed of any suitable material, and is typically metal to provide sufficient mass to prevent movement of the sensor 602 as the printer is used to print one or more parts. The block 632 establishes a common z height for the calibration event aligned with the x-y print plane. The tip 25 of the print head 24 is then raised and moved over the sensor 622 such that the sensor 622 maps to determine an orientation and/or positioning errors of the tip 25.

Figure 20:
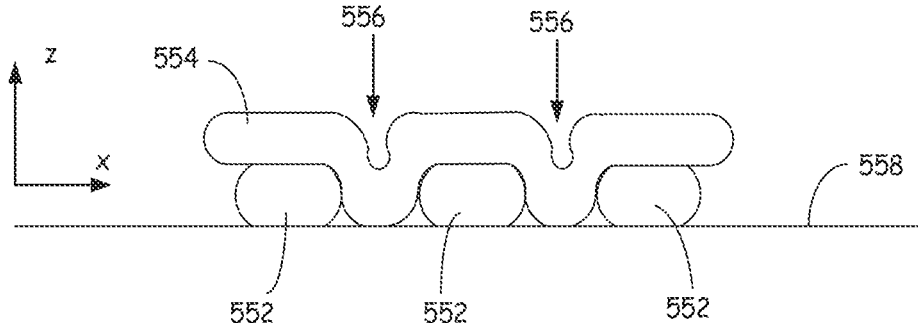
FIG. 20 illustrates portions of a part on a build surface formed from extruded material using a print head controlled to print along a toolpath including a z component to form interlocked joints.

As discussed, in some embodiments, while the nozzle 25 is positioned within the heated build chamber, the x-y gantry can be used to move the print head through x and y directions of a toolpath during printing, while the local Z positioner moves the print head comparatively smaller distances (for example 0.03 inches) in the z direction while extruding material, to provide a toolpath that varies in not only the x, y but also in the z direction. Accurate movement capability in z during extrusion enables planned variable height toolpaths within a layer. This also allows for "Z weaving", formation of overlapped scarfed joint seams, and other part strengthening techniques to be employed. For example, FIG. 20 illustrates portions of a part on a build surface 558 formed from extruded material using a print head controlled to print along a toolpath including a z component, referred to herein as Z weaving. By moving the print head a short distance in the z direction during printing, a layer 554 of material can be deposited on and between portions 552 of a previous layer to form interlocked joints 556, instead of relying upon butt joints and discrete z single-height layers. This increases the strength of the joints and the part. In addition to intra-layer z-height variation, the local z movement of the print head can likewise be used for inter-layer printing, for example, Z weaving between adjacent layers resulting in increased part strength along the z-axis.

Figure 21:
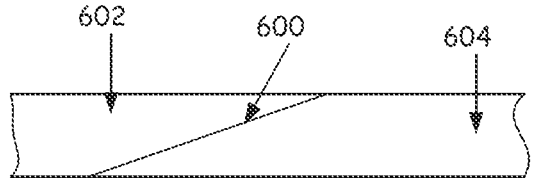
FIG. 21 is a diagrammatic illustration of a scarf joint formed using a print head controlled to print along a toolpath including a z component.
Figure 22:
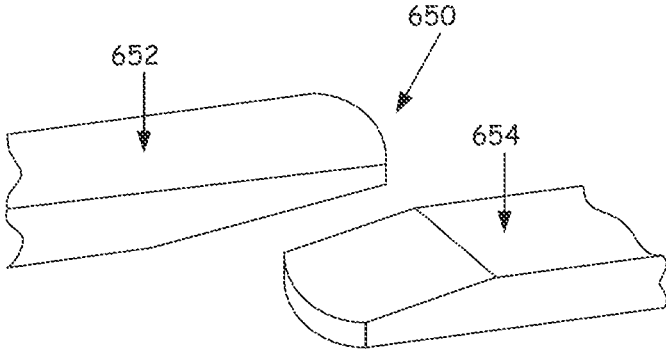
FIG. 22 is another diagrammatic illustration of the formation of a scarf joint in accordance with an exemplary embodiment.

FIG. 21 is a diagrammatic illustration of another interlocked joint, in the form of a scarf seam or scarf joint 600 between layers or extrusions 602 and 604, which can be created with the ability to move the print head in the z direction while extruding material as can be accomplished using disclosed local Z positioners. FIG. 22 provides another illustration, in an exploded perspective view, of formation of a scarf joint 650 between layers 652 and 654. In this example, the scarf joint extrusion placement for printing the joint portion of layer 652 starts at around 30% of the slice height of the first printed layer 654—for example at about 0.003" above the previous layer (not shown) for a 0.010" slice (of layer 654). The pumps of the printer can be started with a pre-pump of extrusion material, then the xy gantry and local Z positioner are controlled to start xy and z direction motion simultaneously. The local Z positioner moves the print head up until extruding has reached the full slice height (at an angle between 35 degrees and 50 degrees from horizontal). Finally, the seam is closed by finishing the seam without moving the print head in the z direction. Seam closing can also utilize tuning of the pump rollback volume.

Figure 23:
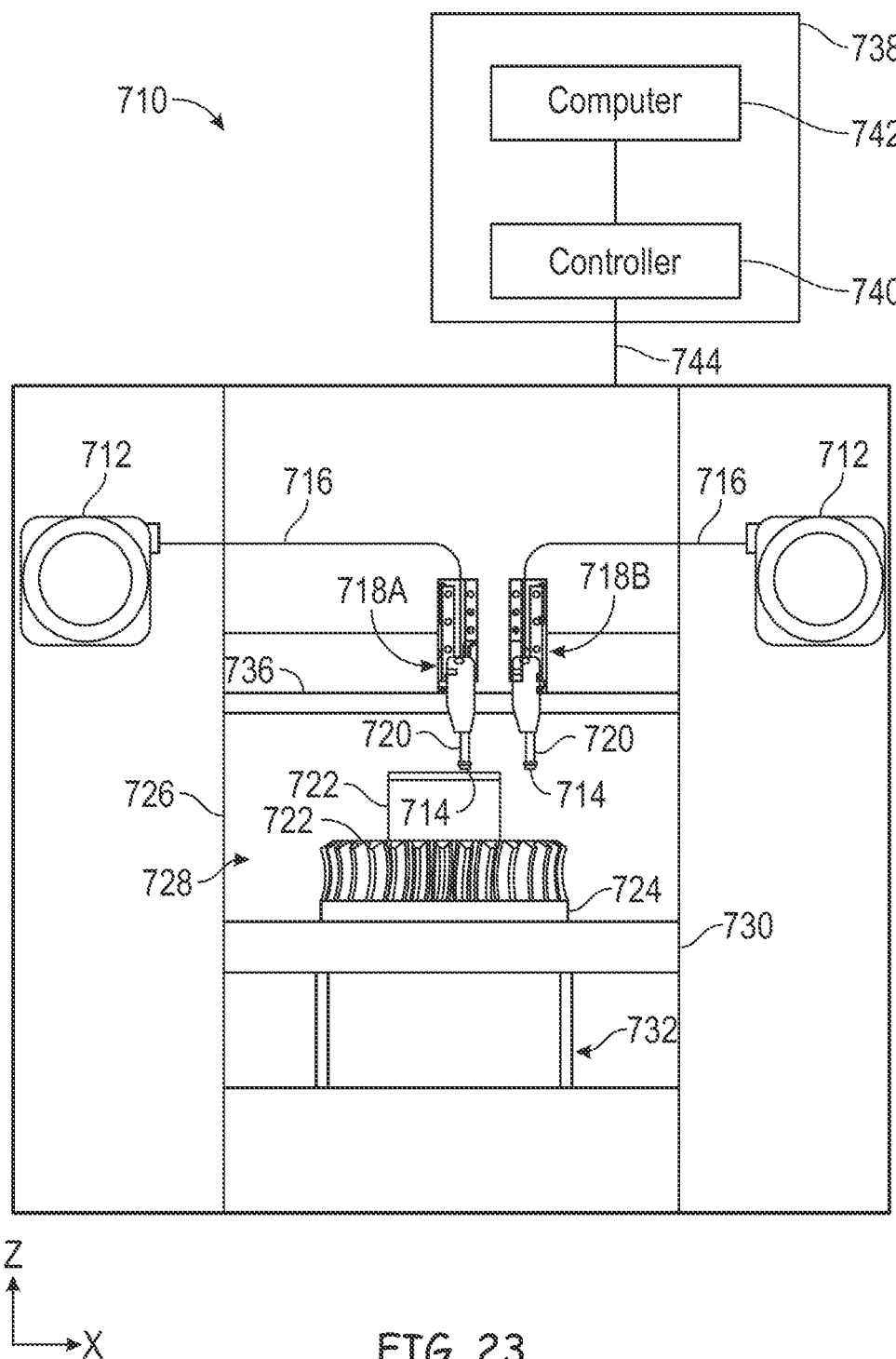
FIG. 23 is a schematic view of another 3D printer having independently move local Z positions for control movement of the print heads.

Referring to FIG. 23, a 3D printer is illustrated at 710 that includes local Z linear motors 717A, 717B for moving print heads 718A and 718B in the z direct independently of each other. As illustrated, the 3D printer 710 has a substantially horizontal xy print plane where the part being printed in indexed in a substantially vertical z direction as the part is printed in a layer by layer manner using the two print heads 718A, 718B. The illustrated 3D printer 710 uses two consumable assemblies 712 that retains a supply of a consumable filament for printing with system 10. In some embodiments, each consumable assembly 712 is an easily loadable, removable, and replaceable container device. Typically, one of the consumable assemblies 712 contains a part material filament, and the other consumable assembly 712 contains a support material filament, each supplying filament to one print head 718A or 718B.

Each print head 718A and 18B includes a housing that retains a liquefier assembly 720 having a nozzle tip 714. Each print head 718A and 718B is configured to receive a consumable material, melt the material in liquefier assembly 20 to product a molten material, and deposit the molten material from a nozzle tip 714 of liquefier assembly 720.

Guide tube 716 interconnects consumable assembly 712 and print head 718A or 718B, where a drive mechanism of print head 718A or 718B (or of 3D printer 710) draws successive segments of the consumable filament from consumable assembly 712, through guide tube 716, to liquefier assembly 720 of print head 718A or 718B. During a build operation, the successive segments of consumable filament that are driven into print head 718A or 718B are heated and melt in liquefier assembly 720. The melted material is extruded through nozzle tip 714 in a layerwise pattern to produce printed parts.

Exemplary 3D printer 710 prints parts or models and corresponding support structures (e.g., 3D part 722 and support structure 724) from the part and support material filaments, respectively, of consumable assemblies 712, using a layer-based, additive manufacturing technique. Suitable 3D printers 10 include fused deposition modeling systems developed by Stratasys, Inc., Eden Prairie, MN under the trademark "FDM".

As shown, the 3D printer 710 includes system casing 726, chamber 728, platen 730, platen gantry 732, head carriage 734, and head gantry 736. System casing 726 is a structural component of 3D printer 710 and may include multiple structural sub-components such as support frames, housing walls, and the like. In some embodiments, system casing 726 may include container bays configured to receive consumable assemblies 712. In alternative embodiments, the container bays may be omitted to reduce the overall footprint of 3D printer 710. In these embodiments, consumable assembly 712 may stand proximate to system casing 726, while providing sufficient ranges of movement for guide tubes 716 and print heads 718A and 718B that are shown schematically in FIG. 22.

Chamber 728 is an enclosed environment that contains platen 730 for printing 3D part 722 and support structure 724. Chamber 728 may be heated (e.g., with circulating heated air) to reduce the rate at which the part and support materials solidify after being extruded and deposited (e.g., to reduce distortions and curling). In alternative embodiments, chamber 728 may be omitted and/or replaced with different types of build environments. For example, 3D part 722 and support structure 724 may be built in a build environment that is open to ambient conditions or may be enclosed with alternative structures (e.g., flexible curtains).

Platen 730 is a platform on which 3D part 722 and support structure 724 are printed in a layer-by-layer manner, and is supported by platen gantry 732. In some embodiments, platen 730 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, DE), or other disposable fabrication for adhering deposited material onto the platen 730 or onto the build substrate. Platen gantry 732 is a gantry assembly configured to move platen 730 along (or substantially along) the vertical z-axis.

Head gantry 736 carries the local Z linear motors 717A and 717B retains each print head 718A and 178B in a manner that prevents or restricts movement of the print head 18 relative to head carriage 736 so that nozzle tip 714 remains in the x-y build plane, but allows nozzle tip 714 of the print head 718A and 718B to be independently and controllably moved into and out of the x-y build plane through movement of local Z linear motors 717A and/or 7171B.

In the shown embodiment, head gantry 736 is a robotic mechanism configured to move the local Z linear motors 717A and 717B and the retained print heads 718A and 718B in (or substantially in) a horizontal x-y plane above platen 730. Examples of suitable gantry assemblies for head gantry 736 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 728. Head gantry 736 may utilize any suitable bridge-type gantry or robotic mechanism for moving the local Z linear motors 717A and 717B and the retained print heads 718A and 718B, such as with one or more motors (e.g., stepper motors and encoded DC motors), gears, pulleys, belts, screws, robotic arms, and the like.

3D printer 710 also includes controller assembly 738, which may include one or more control circuits (e.g., controller 740) and/or one or more host computers (e.g., computer 742) configured to monitor and operate the components of 3D printer 710. For example, one or more of the control functions performed by controller assembly 738, such as performing move compiler functions, can be implemented in hardware, software, firmware, and the like, or a combination thereof; and may include computer-based hardware, such as data storage devices, processors, memory modules, and the like, which may be external and/or internal to system 710.

Controller assembly 38 may communicate over communication line 744 with print heads 718A and 718B, chamber 728 (e.g., with a heating unit for chamber 728), the local Z linear motors 717A and 717B, motors for platen gantry 732 and head gantry 736, and various sensors, calibration devices, display devices, and/or user input devices. In some embodiments, controller assembly 738 may also communicate with one or more of platen 730, platen gantry 732, head gantry 736, and any other suitable component of 3D printer 710. While illustrated as a single signal line, communication line 744 may include one or more electrical, optical, and/or wireless signal lines, which may be external and/or internal to 3D printer 710, allowing controller assembly 38 to communicate with various components of 3D printer 710.

During operation, controller assembly 738 may direct platen gantry 732 to move platen 730 to a predetermined height within chamber 728. Controller assembly 738 may then direct head gantry 36 to move the local Z linear motors 717A and 717B and the retained print heads 718A and 718B around in the horizontal x-y plane above chamber 28 and to move the print heads 718A and 718B into and out of the x-y plane by manipulating the local Z linear motors 717A and 717B, wherein roads of material can be extruded in the x-y plane or in three dimensions, as illustrated in FIGS. 16-18. Controller assembly 738 may also direct print heads 718A and 718B to selectively draw successive segments of the consumable filaments from consumable assembly 712 and through guide tubes 716, respectively to print the part 722 and the support structure 744 in a layer-by-layer manner.

As discussed, embodiments providing a local Z positioner with a linear z motor, allows the disclosed 3D printers to toggle between use of the local Z positioner to implement precision toolpaths including z direction printing with a small range (e.g., moving the print head in the z direction in small increments such as approximately 0.0005 inches or approximately 0.030 inches) of z direction motion while simultaneously using the x-y gantry to move the print head in the x and y directions during some portions of the tool path, and using the local Z positioner as part of a tool changing system with the print heads stored in a tool bin outside of the heated print chamber and thus requiring a larger range of motion (e.g., approximately 8.5 inches). Having both the local z printing movement as well as the tool changing movement enabled by the same movement device results in a high level of location target accuracy, even when switching out one print head with another in the middle of a part build. Knowledge of accurate tip position is essential in order to build an accurate part, especially when switching between two or more print heads during a build; with a variety of print head lengths/heights, as well as tip styles and types for different material extrusion requirements, the use of a local Z positioner maintains the required tip position accuracy even while entering and exiting the build chamber. For example, a following error of less than 12 μm has been observed while moving, with less than 2 μm following error after the local Z positioner comes to rest. The local Z positioner provides other advantages as well, such as increasing glue-less speed due to reduced glue-less move times, as well as enabling in-situ monitoring and correction of layers experiencing overfill and deformation from part curling or tip contamination layer deposition errors. For example, inclusion of the local Z positioner allows the disclosed controllers and computer systems to control print head movement to toggle between multiple toolpaths to increase print speed or for other reasons. Using the local Z positioner to move the print head in the local z direction at high accelerations, while simultaneously moving in xy and maintaining fidelity with low to zero hysteresis, allows disclosed 3D printers to spiral fill, create scarf joint seams, establish near true 3D printing (e.g., 2.75D printing) benefits like creating smoother top surfaces, and utilize Z-weaving toolpaths.

Further, the disclosed 3D printers can utilize the local Z positioner to print multiple z layers without moving the primary z or platen using the platen gantry. For example, in some embodiments, layers over a z direction band of approximately 0.25 inches can be printed while extruding and moving in the z direction with the local Z positioner before moving the primary z gantry or platen. This can in turn extend the life for the primary z gantry and related components by a factor of 50 to 500.

Disclosed 3D printers, utilizing a linear motor driven local Z positioner, provide numerous other benefits as well. Low force back drivability of the linear motor, along with a μm linear encoder make the local positioner driven print head an ideal probe style sensor with the ability to sense contact of the nozzle tip against a surface. Examples include using the nozzle tip to touch off the platen for platen leveling and platen z zero homing, using the nozzle tip to touch off the part for top of part detection, etc. If desired, disclosed 3D printers can also be configured to measure following error on the local Z linear motor (with lower P gains) to thereby measure upward force on the nozzle tip. This allows measurement of overfill or curl of parts.

Another advantage which can be achieved in some embodiments using the lower P gains provided by the local Z positioner is that the ability to have the nozzle tip move up when a vertical force is applied. One primary example is during tip wiping/brushing. Conventionally, the tip wipes need to be accurately located since the tips are very rigid in the z direction. With a linear motor, the P gains can be lowered in the z direction so that the tip cover rides on top of the brush with a prescribed amount of z force to clean the tip. This allows a clean tip to be achieved without as fine of positioning as conventionally required. Lower gains on the local Z positioner can also be beneficial during tool change to allow for some compliance when the tool change master and slave are not at exactly the same height during lock and unlock.

Another advantage of the local Z positioner is the ability to compensate for thermal expansion of the extruder portion of the print head as the extruder portion is heated to operating temperatures after the extruder is positioned within the heated chamber from the unheated tool chamber. Depending upon the extruder design, the extrusion temperature and the heated chamber temperature, the extruder can thermally expand a sufficient amount to adversely affect the printing accuracy. By way of example, an extruder can thermally expand in the range of about 0.005 inches and about 0.002 inches. The thermal expansion is exponential in nature, meaning as the temperature extruder increases, the thermal expansion increases in a non-linear fashion. The local Z positioner with the linear motor provides sufficient resolution to retain the tip end of the extruder in the print plane as the extruder expands as it is heated to an operating temperature.

While the time in which a length of the extruder reaches a steady state is dependent on the extruder design, the extruder operating temperature and the heated chamber temperature, an extruder in the present disclosure reaches a steady state in length in about five minutes with an exponential time constant of about seventy-five seconds. When frequently changing from one print head to another using the tool changer, it is important to preheat the unutilized print heads in their tool crib positions, or the print activities will be significantly delayed while waiting for heat up activities.

Knowing that individual print heads vary slightly in their overall dimensions (and thus their exact tip location relative to a previously used tip within the print head carriage), it is important to compensate for thermal expansion of each tip with respect to its positional tip location, while having a knowledge of its temperature. While the print heads are heated in the tool crib or rack, they have a particular temperature setpoint to maintain, and thus have a particular length, width and overall size. When inserted into the heated printing chamber, they heat even further as they equilibrate to the heated chamber temperature, and can expand even further. A precise knowledge of the expanded size is useful to print accurate parts with a particular print head, whether only one print head is used throughout a build, or whether a variety of print heads are interchanged during a particular part build.

The present disclosure defines a plurality of parameters for each extruder that are material, and therefore, temperature dependent. Exemplary parameters include expansion offset or thermal expansion and the thermal expansion time constant which can be divided into a plurality different time constant values over a plurality of time intervals, due to the exponential nature of the thermal expansion as the temperature rises. These parameters are entered into an empirical exponential equation that models the print head thermal expansion size versus temperature. For the disclosed extruder, the expansion offset ranges from about 0.0005 inches to about 0.002 inches depending on the operating temperature, which is material specific, and the expansion time constant is varied at about fifty second to about ninety second intervals. This variation, if not accommodated for, can significantly affect the intended extruded layer positioning and intended extruded layer height.

In operation, a timer is started when the extruder tip is positioned into the heated chamber. The local Z positioner is actuated to move the print head based upon the exponential equation using the two parameters every cycle such as, but not limited to a 1,000 Hertz update rate. As the linear motor of the local Z positioner can be moved in micron increments, the linear motor of the local Z positioner will gradually move the print head upward over the selected time frame or time constants to maintain the extruder tip in the selected z position while the extruder thermally expands.

In some instances, a tool or print head is returned to service prior to reaching a stabilizing temperature in the tool chamber while positioned in the tool rack. In this instance, only utilizing the expansion offset and the thermal expansion time constant, which assumes a lower steady state temperature would over compensate. To compensate for the potential of returning a tool or print head to service prior to reaching a steady state in the tool chamber, another exponential function can be started as soon as the tool is removed from the heated chamber and placed into the tool rack in the tool chamber to determine the contraction of the tool or print head as it cools. By way of example, the same parameter for the maximum expansion offset would be utilized, but instead of having an exponentially increasing unction, the offset would exponentially decrease such that at time zero, the expansion offset would zero out after the same number of contraction time constants as used for the thermal expansion time constant.

As disclosed above, an open loop control scheme can be utilized where an empirical exponential equation can be utilized based upon the thermal expansion offset and the thermal expansion time constant. However, a closed loop control scheme can also be utilized there a thermocouple is added to the backbone of the extruder so that the mathematical model can be generated that directly changes the local Z position based on the actual backbone.

Figure 24:
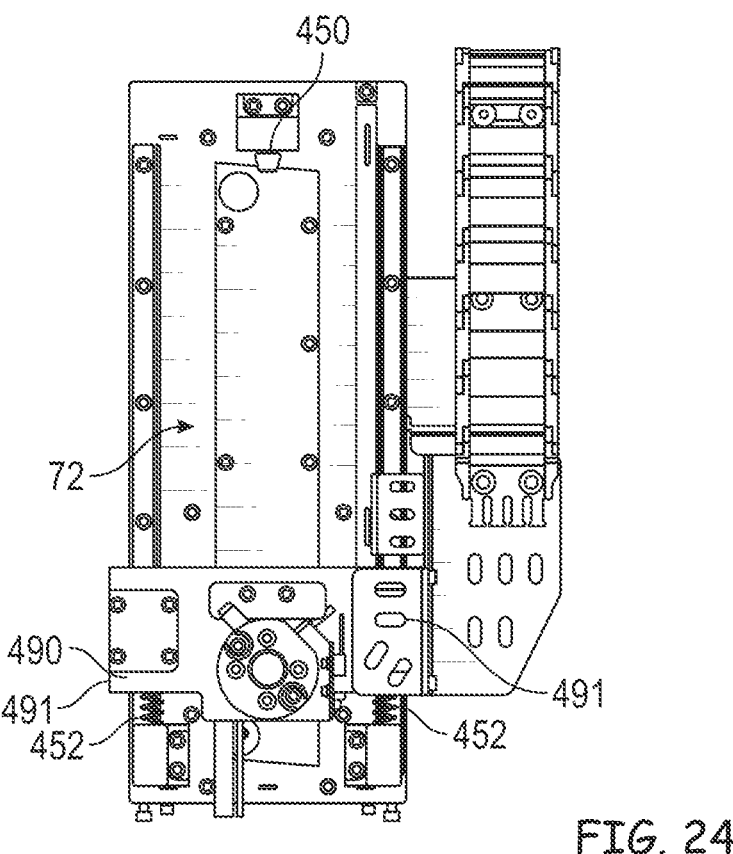
FIG. 24 is a front view of the local Z positioner in a lowered position.
Figure 25:
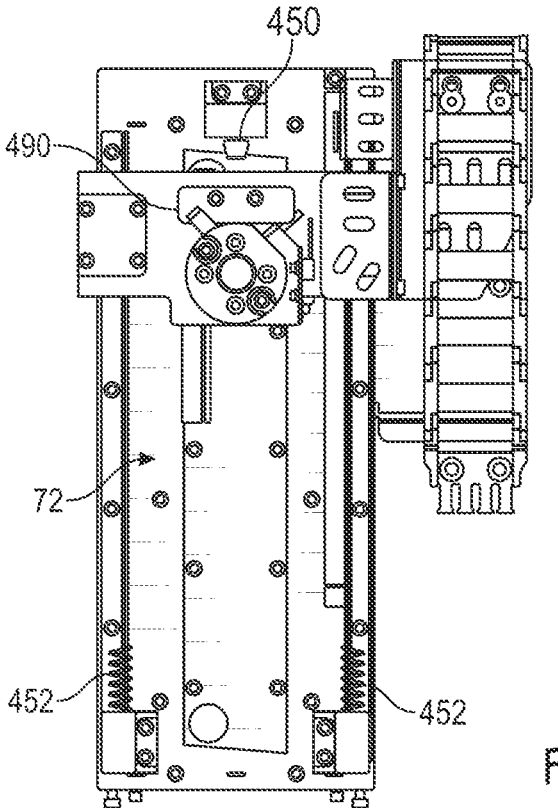
FIG. 25 is a front view of the local Z positioner in a raised position.

Referring to FIGS. 24 and 25, the tool connector 490 of the local Z positioner 72 is illustrated in a lowered position and a raised position, respectively. Referring the FIG. 24, the tool connector 490 of the local Z positioner 72 is illustrated in the lowered position and engaging compression springs 452. The compression springs 452 engage the tool connector 490 proximate edges 490 to maintain substantially equal spring forces on opposite sides of the tool connect 490, which aids in preventing the tool connector 490 from becoming misaligned. Further, the compression springs 452 limit hysteresis or other undesirable positioning errors as the parts are printed, as a typical printing position of the print head 24 is in the lowered position.

Referring to FIG. 25, the tool connector 490 is raised on the local Z positioner 72 to its upper most raised position. In this raised position, the tool connector 490 is proximate the bumper 450. The bumper 450 provide a cushioned positive stop that prevents the tool connector 490 from be raised above an upper limit of the local Z positioner 72. In the event the tool connector 490 does contact the bumper 450 which provides a cushion to lessen the impact while retaining the tool connector 490 to the local Z positioner 72. Lessing the impact of the tool connector 490 with the local Z positioner 72 aids in keeping the local Z positioner 72 in operation while also aiding in maintaining reliability of the local Z positioner 72.

Although the present disclosure may have been described with reference to preferred embodiments, workers skilled in the art will recognize that changes may be made in form and detail without departing from the spirit and scope of the disclosure.

The invention claimed is:

1. A 3D printer comprising:
   a gantry configured to move in a substantially horizontal x-y plane and in a substantially vertical z-direction substantially normal to the substantially horizontal x-y plane;
   at least one print head carried by the gantry, the at least one print head comprising an extrusion nozzle at a bottom end;
   a print head chamber containing the at least one print head and the gantry;
   a plurality of partitioned chambers accessible by the at least one print head, each of the partitioned chambers having an upper edge defining an opening into a cavity in each of the plurality of partitioned, chambers, wherein a lower first one of the plurality of chambers comprises a plurality of walls having first surface defining a heated build chamber and wherein a second surface of one of the plurality of walls defines a portion of an upper second chamber, wherein the upper second chamber is configured to service a print head prior to or after use in the build chamber;
   the print head chamber above all of the plurality of chambers; and
   a platen within the heated build chamber of the plurality of chambers, the platen configured to receive material from the print head to print the 3D part;
   wherein the gantry is positioned above each of the plurality of partitioned chambers such that the at least one print head is configured to be moved between each of the plurality of partitioned chambers by raising the print head in the substantially vertical z-direction substantially normal to the substantially horizontal x-y plane such that the extrusion nozzle is above the upper edge of the upper second chamber, moving the at least one print head in the substantially horizontal x-y plane from a first location above the heated build chamber of the plurality of partitioned, chambers to a second location above the second chamber of the plurality of partitioned chambers and lowering the at least one print head in the substantially vertical z-direction into a cavity of the second chamber such that at least one print head can be serviced prior to being used to print at least a portion of a 3D part in the heated build chamber.

2. The 3D printer of claim 1, wherein the build chamber is configured to be is actively heated.

3. The 3D printer of claim 1, wherein the second chamber comprises a calibration chamber having a sensor configured to determine a x,y, z position of the nozzle on the print head.

4. The 3D printer of claim 3, wherein the second chamber of the plurality of chambers is configured to clean a nozzle of the at least one print head or provide a volume to purge the at least one print head to reach a condition to print the 3D part.

5. The 3D printer of claim 1, and further comprising a thermal barrier above the plurality of chambers, wherein the thermal barrier provides the at least one print head access to each of the plurality of partitioned chambers.

6. The 3D printer of claim 5, wherein the thermal barrier comprises:
   a first strap extending between opposing sides of the thermal barrier and having a first free edge; and
   a second strap extending between the opposing sides of the thermal barrier and having a second free edge that overlaps with the first free edge to form a slit though which the bottom end of the at least one print head is inserted to each of the plurality of partitioned chambers through the slit.

7. The 3D printer of claim 2, wherein the gantry comprises a local z-direction linear motor configured to move the at least one print head substantially vertically.

8. The 3D printer of claim 2, wherein the gantry comprises:
   an x-direction linear motor; and
   a y-direction linear motor, wherein the x-direction linear motor and the y-direction linear motor are configured to move the at least one print head in the x-y plane.

9. A 3D printer comprising:
   a gantry configured to move in a substantially horizontal x-y plane and in a substantially vertical z-direction substantially normal to the plane;
   at least one print head carried by the gantry, the at least one print head comprising an extrusion nozzle at a bottom end;
   a print head chamber containing the at least one print head and the gantry;
   a plurality of partitioned chambers accessible by the at least one print head, each of the partitioned chambers having an upper edge defining an opening to a cavity in each of the plurality of chambers, wherein a first chamber comprises a plurality of walls having first surfaces defining a first heated lower build chamber and a second upper chamber located external to the first chamber wherein a second surface of one of the plurality of walls defines a portion of the second chamber, wherein the second chamber is configured to service the at least one print head;
   a print head chamber above all of the plurality of chambers; and
   a thermal barrier spanning the plurality of partitioned chambers and located above the upper edges of the plurality of partitioned chambers, wherein the at least one print head is configured to access each of the plurality of partitioned chambers through the thermal barrier;
   wherein the gantry is positioned above each of the plurality of partitioned chambers such that the at least one print head is configured to be moved between each of the plurality of partitioned chambers by raising the print head in the substantially vertical z-direction substantially normal to the substantially horizontal x-y plane such that the extrusion nozzle is above the thermal barrier and the upper edge of the second chamber, moving the print head in the substantially horizontal x-y plane from a first location above the second chamber configured to service the at least one print head to a second location above the heated build chamber of the plurality of partitioned chambers and lowering the at least one print head in the substantially vertical z-direction into a cavity of the heated build chamber through the thermal barrier such that at least a portion of a 3D part can be printed in a layerwise manner.

10. The 3D printer of claim 9, wherein the heated build chamber includes a build platen for receiving material from the at least one print head.

11. The 3D printer of claim 9, wherein the second chamber of the plurality of partitioned chambers comprises a calibration chamber having a sensor configured to determine a x,y, z position of the extrusion nozzle on the at least one print head.

12. The 3D printer of claim 11, wherein the second chamber of the plurality of chambers is configured to clean a nozzle of the at least one print head or provide a volume to purge the at least one print head to reach a condition to print the 3D part.

13. The 3D printer of claim 9, wherein the thermal barrier comprises:
   a first strap extending between opposing sides of the thermal barrier and having a first free edge; and
   a second strap extending between the opposing sides of the thermal barrier and having a second free edge that overlaps with the first free edge to form a slit though which the bottom end of the at least one print head is inserted to each of the plurality of partitioned chambers through the slit.

14. The 3D printer of claim 9, wherein the gantry comprises a local z-direction linear motor configured to move the at least one print head substantially vertically.

15. The 3D printer of claim 9, wherein the gantry comprises:
   an x-direction linear motor; and
   a y-direction linear motor, wherein the x-direction linear motor and the y-direction linear motor are configured to move the at least one print head in the x-y plane.

16. A 3D printer comprising:
   a gantry configured to move in an x-y plane and in a z-direction substantially normal to the x-y plane;
   at least one print head carried by the gantry, the at least one print head comprising an extrusion nozzle at a bottom end;
   a plurality of partitioned chambers accessible by the at least one print head, each of the partitioned chambers having an upper edge defining an opening into each of the plurality of partitioned chambers; and
   a thermal barrier spanning the plurality of vertically aligned partitioned chambers and located above the upper edges of the plurality of partitioned chambers, the thermal barrier comprising:

a first strap extending between opposing sides of the thermal barrier and having a first free edge; and a second strap extending between the opposing sides of the thermal barrier and having a second free edge that overlaps with the first free edge to form a slit through which the bottom end of the at least one print head is inserted into each of the plurality of vertically aligned partitioned chambers through the slit;

wherein the at least one print head is configured to be moved between each of the plurality of vertically aligned partitioned chambers by raising the print head in the z-direction and through the slit such that the extrusion nozzle is above the thermal barrier, moving the print head in the x-y plane from a first location above the first chamber of the plurality of vertically aligned partitioned chambers to a second location above the upper edge of the second chamber of the plurality of vertically aligned partitioned chambers and lowering the at least one print head in the z-direction into the second chamber through the slit in the thermal partition.

17. The 3D printer of claim 16, wherein a first chamber of the plurality of partitioned chambers is a build chamber that is actively heated and includes a build platen for receiving material from the print head.

18. The 3D printer of claim 16, wherein a second chamber of the plurality of partitioned chambers comprises a calibration chamber having an inductive sensor configured to determine a x,y, z position of the nozzle on the print head.

19. The 3D printer of claim 18, wherein the second chamber is actively cooled.

* * * * *